United States Patent
Meier

(10) Patent No.: US 7,894,299 B2
(45) Date of Patent: Feb. 22, 2011

(54) CONVERTED MODE SEISMIC SURVEY DESIGN

(75) Inventor: Mark A. Meier, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 217 days.

(21) Appl. No.: 12/304,698

(22) PCT Filed: Jun. 27, 2007

(86) PCT No.: PCT/US2007/014942

§ 371 (c)(1),
(2), (4) Date: Dec. 12, 2008

(87) PCT Pub. No.: WO2008/024150

PCT Pub. Date: Feb. 28, 2008

(65) Prior Publication Data

US 2009/0296524 A1  Dec. 3, 2009

Related U.S. Application Data

(60) Provisional application No. 60/839,209, filed on Aug. 22, 2006.

(51) Int. Cl.
*G01V 1/28* (2006.01)
(52) U.S. Cl. .............. 367/50; 367/38; 367/51; 367/56; 702/14
(58) Field of Classification Search .......... 367/38, 367/50, 51, 52, 56, 58, 73, 75; 702/14
See application file for complete search history.

(56) References Cited

U.S. PATENT DOCUMENTS

| | | | |
|---|---|---|---|
| 6,128,580 A | 10/2000 | Thomsen | 702/18 |
| 6,292,754 B1 * | 9/2001 | Thomsen | 702/14 |
| 6,665,618 B1 | 12/2003 | Thomas et al. | 702/14 |
| 6,731,568 B1 | 5/2004 | Audebert et al. | 367/75 |
| 6,820,010 B1 | 11/2004 | Sahai et al. | 702/18 |
| 6,856,911 B2 * | 2/2005 | Wang et al. | 702/14 |
| 2005/0105393 A1 | 5/2005 | Martinez et al. | 367/50 |

OTHER PUBLICATIONS

Gabor, D. (1946) "Theory of Communication," *J. IEE*, 93, pp. 429-441.

(Continued)

*Primary Examiner*—Ian J Lobo
(74) *Attorney, Agent, or Firm*—ExxonMobil Upstream Research Co. Law Dept.

(57) ABSTRACT

Method for designing a converted mode (PS or SP) seismic survey to accomplish specified vertical and lateral resolution objectives at target depth. An equation (181) is provided for determining the minimum bandwidth required for a desired vertical resolution at a selected scattering angle, as a function of incident and reflected wave velocities, one of which is the P-wave velocity and the other is the S-wave velocity. A second equation (182) is provided for determining migration acceptance angle from the desired vertical and lateral resolutions. Source and receiver apertures may then be determined by ray tracing. Finally, a third equation (183) is provided for the maximum bin size to avoid aliasing, given the migration acceptance angle and a maximum frequency needed to achieve the bandwidth requirement. Source and receiver spacing may then be based on the maximum bin size.

8 Claims, 12 Drawing Sheets

OTHER PUBLICATIONS

Garotta, R. et al. (2003) "Some Requirements For PS-Mode Acquisition," *The Leading Edge*, 22.2, pp. 106-112.

Grechka, V. et al. (2003) "Generation and Processing of Pseudo-Shear-Wave Data: Theory and Case Study," *Geophysics*, 68.6, pp. 1807-1816 (XP002422726).

Hoffman, J. (2001) "Illumination, Resolution, and Image Quality of PP- and PS-Waves for Survey Planning," *The Leading Edge*, 20, pp. 1008-1014.

Lawton, D. (1995) "Converted-Wave 3-D Surveys: Design Strategies and Pitfalls," *SEG $22^{nd}$ Ann. Canadian National Convention Abstracts*, pp. 69-70.

Mahmoudian, et al. (2004) "Three Parameter AVO Inversion With PP and PS Data Using Offset Binning, CREWES Project," SEC Report, 4 pages.

Nolte, B. et al. (2004) "3D OBS (Ocean-Bottom Seismic) Survey Design: Estimating Lateral Resolution and Acquisition Footprint," *EAGE $66^{th}$ Conf. & Exh.*, p. 197, 4 pages.

Stewart, R. R. et al. (2002) "Converted Wave Seismic Exploration: Methods," *Geophysics* 67, pp. 1348-1363.

Trantham, E. C. (1993) "Minimum Uncertainty Pulses for Filters," *Geophysics*, 58, pp. 853-862.

Vermeer, G. J. O (1999) "Converted Waves: Properties and 3D Survey Design," $69^{th}$ Annual *SEG Int'l Mtg., Expanded Abstracts*, SACQ22.6, pp. 645-648.

Vermeer, G. J. O (2002) "3-D Seismic Survey Design," *Soc. Exp. Geo.*, Chapters 6 and 8.

European Standard Search Report, No. RS114371, dated Mar. 1, 1007, 2 pages.

PCT International Search and Written Opinion, dated Aug. 14, 2008, 4 pages.

Alfaraj, M. et al. (1992) "Transformation to Zero Offset for Mode-Converted Waves," *Geophysics*, 57.3, pp. 474-477 (XP000330778).

Berkhout, A. J. (1984) *Seismic Resolution*, Geophysical Press, v12, pp. 167-175.

Beylkin, G. et al. (1985) "Spatial Resolution of Migration Algorithms," in *Proceedings of the $14^{th}$ International Symposium on Acoustical Imaging*, ed. A. J. Berkhout, J. Ridder, and L. F. van der Wal, pp. 155-167.

Carey, P. W. et al. (2003) "Bandlimited Design and Stacking of P-P and P-S Surveys," *SEG $73^{rd}$ Ann. Int'l Mtg., Expanded Abstracts*, MC 3-8, pp. 842-845.

Cordsen, et al. (2000) "Planning Land 3-D Seismic Surveys," *Society of Exploration Geophysicists*, Geophysical Dev. Series 9, pp. 177-180.

Criss, C. J. et al. (2003) "Ocean-Bottom Survey Acquisition Design for 3D Converted Waves," *Offshore Int.*, 63, pp. 129-130.

Devaney, A. J. (1984) "Geophysical Diffraction Tomography," *IEEE Transactions on Geoscience and Remote Sensing*, GE-22, pp. 3-13.

Dickens, T. A. and Winbow, G. A. (1997) "Spatial Resolution of Diffraction Tomography," *Journal of the Acoustical Society of America*, 101, pp. 77-86.

* cited by examiner

Determine Required Bandwidth from

$$BW \geq \frac{V_\alpha V_\beta}{2R_v (V_\beta \cos\alpha + V_\alpha \cos\beta)}$$

or Related Equation.

Determine Migration Acceptance Angle

$$\sin\theta_a \approx \frac{R_v}{R_{lm}}$$

and Corresponding Source and Receiver Apertures.

Determine Bin Size Required to Avoid Aliasing from

$$\Delta x \leq \frac{V_\alpha V_\beta}{2(V_\beta^2 + 2V_\alpha V_\beta \cos\psi + V_\alpha^2)^{1/2} f_{max} \sin\theta_a}$$

or Related Equation.

*FIG. 18*

CONVERTED MODE SEISMIC SURVEY DESIGN

This application is a National Stage entry under 35 U.S.C. 371 of PCT/US2007/014942 that published as WO 2008/024150 and was filed on Jun. 27, 2007 and claims the benefit of U.S. Provisional application 60/839,209 which was filed on Aug. 22, 2006.

FIELD OF THE INVENTION

The invention relates generally to the field of geophysical prospecting and, more particularly, to designing seismic reflection surveys of subterranean regions. Specifically, the invention is a method for designing a converted mode seismic survey to accomplish specified resolution objectives with efficient utilization of survey source and receiver equipment.

BACKGROUND OF THE INVENTION

The method of reflection seismology is an important tool used to image or determine properties of the earth. The method generally includes a source, or distribution of sources, usually on or near the earth's surface that excites a seismic wave into the earth; and a receiver, or distribution of receivers, that records the wave that is reflected (or scattered) back from the earth. Many different types, or modes, of seismic waves are known. The compressional wave, or P-wave, is the most widely used mode. The shear wave, or S-wave, is another mode that has proven to have some utility under certain circumstances. A source may excite one or both modes, and a receiver may record one or both modes.

The most frequent implementation of the reflection seismology method exploits the P-wave. A P-wave is excited by the source and propagates into the earth where it is reflected (or scattered) back from the earth and recorded by receivers. This is known as PP reflection seismology. Another implementation of the reflection seismology method exploits the S-wave; an S-wave is excited by the source and propagates into the earth where it is reflected (or scattered) back from the earth and recorded by receivers. This is known as SS reflection seismology. Both the PP and SS reflection seismology methods are referred to as "common mode" methods because the wave mode incident into the earth from the source is the same as the wave mode reflected (or scattered) back from the earth.

The practice of seismic survey design incorporates many methods and procedures to estimate requirements for seismic survey acquisition parameters so that specific technical objectives may be achieved with the acquired seismic data. One such objective is seismic image resolution. With regard to common mode seismic surveys, methods and procedures exist to determine required acquisition parameters to achieve desired seismic image resolution. Many aspects of these methods and procedures are discussed in the geophysical and imaging literature and have been wholly or partly used in various forms in the practice of seismic survey design for many years. Though some unresolved issues remain, the practice of designing common mode seismic surveys by one or another of these methods and procedures to achieve specified seismic image resolution is well established. See for example, "Planning Land 3-D Seismic Surveys," by Cordsen, et al., Society of Exploration Geophysicists (2000).

In recent years, some attention has turned to seismic surveys which are not common mode but are, rather, "converted mode," sometimes referred to as "converted wave." The converted mode seismic survey differs from the common mode seismic survey in that the wave mode incident into the earth from the source is different from the wave mode reflected (or scattered) back from the earth. An example is PS reflection seismology, where a P-wave is excited by the source and propagates into the earth, and an S-wave is reflected (or scattered) back from the earth and recorded by receivers. Another example is SP reflection seismology, where an S wave is excited by the source and propagates into the earth, and a P-wave is reflected (or scattered) back from the earth and recorded by receivers. The characteristics of converted wave reflection seismology are substantially different from common mode reflection seismology. Methods and procedures used in designing common mode reflection seismology surveys are not directly applicable to designing converted mode reflection seismology surveys. Consequently, though the practice of design of common mode seismic surveys to achieve specified seismic image resolution is well established, the same is not true for converted mode seismic surveys.

Converted mode surveys are sometimes pursued when it is known that a compressional wave survey will not produce the required information. This has been demonstrated, for example, in some marine circumstances where shallow gas charged sections prevent compressional wave imaging of deeper sections; and has been demonstrated to some degree in cases where the P-wave impedance of the target reservoir is very low and undetectable relative to S-wave impedance. There have been some reports from recent research that converted mode surveys may provide useful added information, generally, and should therefore be run more often in conjunction with conventional surveys. Of the two types of converted wave surveys, PS is the most discussed and practiced to date. The SP survey has been problematic to implement in the marine case. Publications that discuss design of converted mode seismic surveys include:

Gijs J. O. Vermeer, "Converted waves: properties and 3D survey design," 69th Annual International Meeting of the *Society of Exploration Geophysicists*, Expanded Abstracts, SACQ22.6, pp. 645-648 (1999);

Gijs J. O. Vermeer, "3-D Seismic Survey Design" (especially Chapters 6 and 8), *Society of Exploration Geophysicists* (2002);

B. Nolte, J. Etgen and R. Read, "3D OBS (Ocean-Bottom Seismic) survey design: estimating lateral resolution and acquisition footprint," EAGE 66th Conference & Exhibition, P197, (2004);

Peter W. Carey and Don C. Lawton, "Bandlimited design and stacking of P-P and P-S surveys," 73rd Annual International Meeting of the *Society of Exploration Geophysicists*, Expanded Abstracts, MC 3-8, pp. 842-845 (2003).

C. Jason Criss and Jim Musser, "Ocean-bottom survey acquisition design for 3D converted waves," *Offshore Int.* 63, 129-130, (2003).

R. Garotta and P. Y. Granger, "Some requirements for PS-mode acquisition," *The Leading Edge* 22, 106-112 (2003);

Robert R. Stewart et al., "Converted wave seismic exploration: Methods," *Geophysics* 67, 1348-1363 (2002);

Jurgen Hoffman, "Illumination, resolution, and image quality of PP- and PS-waves for survey planning," *The Leading Edge* 20, 1008-1014 (2001); and Don Lawton, "Converted-wave 3-D surveys: Design strategies and pitfalls," 22nd Annual Canadian *Society of Exploration Geophysicists* National Convention Abstracts, pp. 69-70 (1995).

What is needed is a method for designing a converted mode seismic survey that is as developed and complete as are current methods for designing common mode seismic surveys, and that yields a survey design that satisfies pre-selected resolution criteria at target depth. The present method satisfies this need.

SUMMARY OF THE INVENTION

In one embodiment, the invention is a method for designing a converted-wave seismic survey of a subsurface region to accomplish specified resolution objectives, comprising:

(a) selecting a desired vertical seismic resolution at target depth and a desired lateral seismic resolution at target depth;

(b) determining a minimum source frequency bandwidth required to achieve the selected vertical seismic resolution at target depth, said determination of minimum bandwidth requiring P-wave and S-wave velocities at the target depth and a selected scattering angle $\psi$ between incident and reflected seismic waves or one or more quantities relatable thereto, then selecting a bandwidth≧the minimum bandwidth;

(c) determining a migration acceptance angle and corresponding source and receiver apertures required to achieve the specified lateral seismic resolution at the target depth;

(d) determining a maximum bin size required to avoid aliasing a seismic wave returned from the target depth, said determination of maximum bin size requiring P-wave and S-wave velocities at the target depth and the selected scattering angle $\psi$ between incident and reflected seismic waves or one or more quantities relatable thereto, a largest frequency required to achieve the bandwidth selected in step (b), and the migration acceptance angle from step (c), then selecting a bin size≦said maximum bin size; and (e) determining source and receiver spacings for the survey, using the selected bin size, and determining areas to be covered by source and receiver locations using the source and receiver apertures from step (c).

Data from such a survey, after processing and interpretation, may indicate formations likely to contain hydrocarbons, which can then be produced by one or more wells drilled at locations and to depths consistent with the interpreted data.

BRIEF DESCRIPTION OF THE DRAWINGS

The present invention and its advantages will be better understood by referring to the following detailed description and the attached drawings in which:

FIG. 18 is a flow chart showing basic steps in one embodiment of the present inventive method;

A common feature in different drawings may be given the same reference number. In many of the drawings, a source position is indicated by a flag and a receiver position by an inverted triangle.

Figure 1:
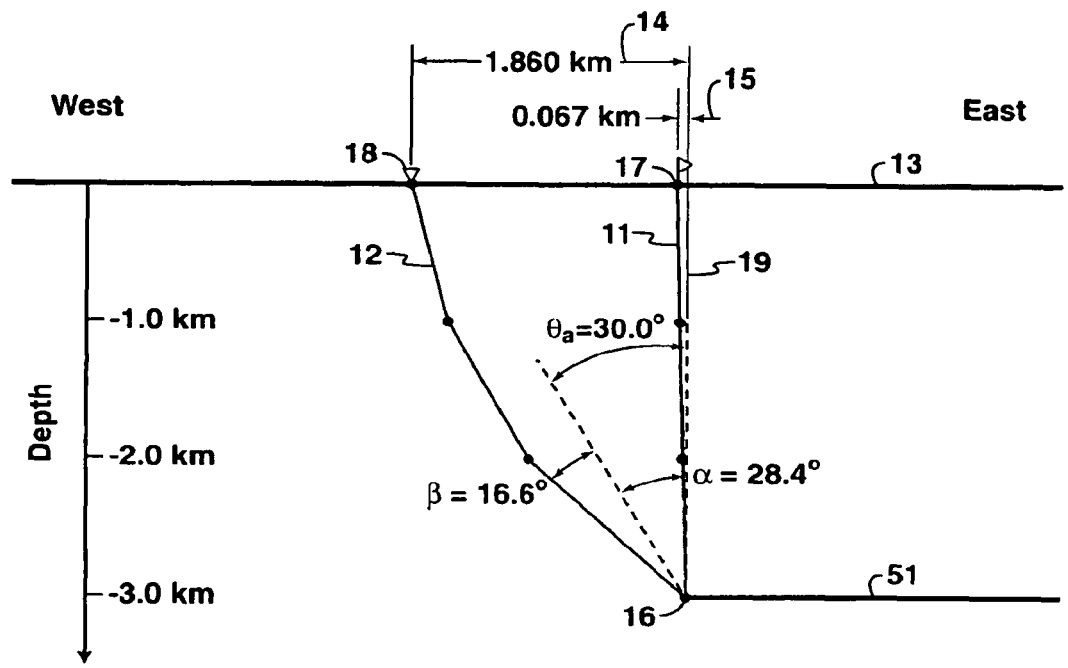
FIGS. 1-5 illustrate determination of migration acceptance angle and corresponding source and receiver apertures in Example 1.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is a method for designing converted mode seismic surveys to achieve specified seismic image resolution. There are many aspects to designing a seismic survey other than meeting desired image resolution values, but those other aspects are not part of the technical problem that this invention addresses.

A procedure to design common mode seismic surveys to achieve specified seismic image resolution will be described first. This procedure may be used to design common mode seismic surveys to image or determine earth properties at a depth of interest (the "target depth") in a layered earth using sources and receivers on the earth's surface. It includes three primary steps: i) determine the bandwidth required to achieve the specified vertical seismic resolution at the target depth, ii) determine the migration acceptance angle and corresponding aperture required to achieve the specified lateral seismic resolution at the target depth, iii) determine the bin size required to avoid aliasing the seismic wave returned from the target depth. These steps are described below.

i) Determine the Bandwidth Required to Achieve the Specified Vertical Seismic Resolution at the Target Depth.

Given the specified vertical resolution at the target depth, $R_v$, and the propagation velocity of the seismic wave at the target depth, V, the relationship with bandwidth, BW, is given by $$R_v \geq \frac{V}{4BW}. \tag{1}$$

(Similar forms of this relationship can be found in the published literature; see, for example, Eqn. 2.42 in Cordsen's book, *Planning Land 3-D Seismic Surveys*.) Consequently, the required bandwidth is determined by $BW \geq V/(4R_v)$. The minimum required bandwidth is given by the equality. This relation holds for the noise-free Ricker wavelet. Because the actual wavelet typically realized in seismic data is not exactly a Ricker wavelet and not perfectly noise-free, a somewhat larger bandwidth may actually be required to achieve the vertical resolution objective. A range is typically considered up to twice the minimum required bandwidth. The appropriate value within this range is often determined by experience with seismic surveys in the same geographical regions and under the same conditions, or by other empirical means.

ii) Determine the Migration Acceptance Angle and Corresponding Aperture Required to Achieve the Specified Lateral Seismic Resolution at the Target Depth.

Given the specified lateral resolution at the target depth, $R_{lm}$, the relationship with migration acceptance angle, $\theta_\alpha$, is given by $$R_{lm} \approx \frac{R_v}{\sin\theta_\alpha}. \quad (2)$$

(This relationship is also known; see for example Eqn. 8.7c in Vermeer's book, 3-D Seismic Survey Design.) Consequently, the minimum required migration acceptance angle is determined by $\theta_\alpha \approx \arcsin(R_v/R_{lm})$. Once the minimum required migration acceptance angle is determined, ray tracing may be used to determine the corresponding aperture. For example, if a migration acceptance angle of 35 degrees was determined, a ray starting at the target depth with a take-off angle of 35 degrees, that is, an angle of 35 degrees from the vertical, is ray traced upward through the velocity model of the earth, to the surface, forming a ray path from the target depth to the earth's surface. The lateral distance between the starting point of the ray path and the ending point of the ray path is the aperture. The aperture describes the region on the earth's surface beyond the surface area overlying the image area where sources and receivers need to be distributed in order to capture the migration acceptance angle for all points in the image area.

The solution described above is for a zero offset geometry; that is, a geometry where the distance between the source and receiver is zero. A dip-move-out term may be added to the zero offset solution to determine the aperture applicable for finite offsets; that is, geometries where the distance between the source and receiver is not zero. In this case, the sum of the zero offset aperture solution and the dip-move-out term describe the midpoint aperture, that is, the region on the earth's surface beyond the surface area overlying the image area where source and receiver midpoints need to be distributed in order to capture the migration acceptance angle for all points in the image area. Once the regions of midpoint coverage are known, the corresponding source and receiver apertures (also referred to as source and receiver aprons) can be determined; where the source aperture describes the region on the earth's surface beyond the surface area overlying the image area where sources need to be distributed in order to capture the migration acceptance angle for all points in the image area, and the receiver aperture describes the region on the earth's surface beyond the surface area overlying the image area where receivers need to be distributed in order to capture the migration acceptance angle for all points in the image area.

iii) Determine the Bin Size Required to Avoid Aliasing the Seismic Wave Returned from the Target Depth.

Aliasing is a phenomenon that occurs when a wavefield is under-sampled (either source or receiver spacings, or both, are too large) in a seismic survey, resulting in frequency or wavenumber ambiguity. It can have harmful effects on the performance of imaging algorithms which perceive an aliased wavefield to be something other than what it is and, consequently, do not correctly image the wavefield. It is typical practice to implement seismic imaging algorithms in the common offset domain; that is, on seismic data associated with a single offset or small range of offsets. A seismic trace (i.e., a time recording of seismic data associated with a single receiver and a single source) may be referenced by the midpoint between the corresponding source and receiver locations. The seismic traces with a common offset may be spatially arranged according to their midpoints. Spatial bins may be defined for a common offset, and seismic traces whose midpoints are within the boundaries of a bin are assigned to that bin. In order to avoid aliasing when applying an imaging algorithm to common offset seismic data, all bins must be occupied by at least one trace and the bin size must not exceed $$\Delta x \leq \frac{V}{4 f_{max} \sin\theta_\alpha}, \quad (3)$$

where $f_{max}$ is the largest frequency required to achieve the bandwidth requirement determined in the first step, $\theta_\alpha$ is the migration acceptance angle requirement determined in the second step, and V is the propagation velocity of the seismic wave at the target depth. The maximum allowed bin size is given by the equality. The bin size requirement is subsequently used to determine the maximum intervals between source stations and between receiver stations that are allowed when acquiring the seismic survey. Equation (3) is also known; see for example, Eqn. 2.35 in Cordsen's book, Planning Land 3-D Seismic Surveys.

Methods and procedures used in designing common mode reflection seismology surveys (such as the method described above) are not directly applicable to designing converted mode reflection seismology surveys. This is largely due to the fact that the incident and reflected (or scattered) waves are two different modes and, generally, propagate with two different velocities. The distribution of scattered energy is also different. Relationships between seismic image resolution and acquisition parameters for the case of the converted mode seismic survey are presented below and used to develop a new procedure for design of converted mode seismic surveys to achieve specified seismic image resolution. The invention consists of the following steps.

i) Determine the Bandwidth Required to Achieve the Specified Vertical Seismic Resolution at the Target Depth (Step 181 in the Flow Chart of FIG. 18).

Bandwidth requirements determine the frequency range and power required of a seismic source used in seismic acquisition. Given a specified vertical resolution at the target depth, $R_v$, the propagation velocity of the incident seismic wave at the target depth, $V_\alpha$, and the propagation velocity of the reflected (or scattered) seismic wave at the target depth, $V_\beta$, the relationship with bandwidth, BW, is given by $$R_v \geq \frac{V_\alpha V_\beta}{2BW(V_\beta \cos\alpha + V_\alpha \cos\beta)},$$

where $\alpha$ is the angle of incidence, and $\beta$ is the angle of reflection. Or, put another way, $\alpha$ is the angle between the wavenumber vector of the incident seismic wave and the spatial gradient of the two-way travel time function, and $\beta$ is the angle between the negative of the wavenumber vector of the reflected (or scattered) seismic wave and the spatial gradient of the two-way travel time function. The angles $\alpha$ and $\beta$ are dependent on each other, related by Snell's law, $$\frac{\sin\alpha}{V_\alpha} = \frac{\sin\beta}{V_\beta}.$$

The sum of $\alpha$ and $\beta$ is the scattering angle, denoted $\psi$, between the incident and reflected (or scattered) seismic waves. The introduction of these variables is important because the normally incident or backscatter condition in which $\alpha=\beta=\psi=0$ does not return energy for the case of converted modes (at least in isotropic media).

Consequently, the required bandwidth is determined by $$BW \geq \frac{V_\alpha V_\beta}{2R_v(V_\beta \cos\alpha + V_\alpha \cos\beta)}. \quad (4)$$

The minimum required bandwidth is given by the equality. The added variables $\alpha$ and $\beta$ require the survey designer to choose some finite scattering angle that is to be considered. In the case of common mode survey design, the backscatter condition $\alpha=\beta=\psi=0$, or similarly, a small scattering angle, is appropriate to consider because small angles typically return substantial energy. However, small angles do not typically return energy for the converted mode case. A study of the property contrasts that cause the reflected (or scattered) seismic waves may be pursued to identify scattering angles that return useful energy; e.g., an amplitude-versus-angle analysis. If property contrast information is unavailable or incomplete, it may be appropriate to assume a scattering angle at, or near, 45 degrees will return sufficient energy and is, therefore, appropriate to consider for survey design. Another approach may be to identify the offsets for which maximum energy is returned, and then determine the corresponding scattering angle by ray tracing. Once the survey designer has determined what angle of incidence, $\alpha$, is important for the design, the angle of reflection, $\beta$, may be determined from Snell's law. Or, if the survey designer has decided what scattering angle is important for the design, the angles $\alpha$ and $\beta$ are determined from the relations $$\tan\alpha = \frac{V_\alpha \sin\psi}{V_\beta + V_\alpha \cos\psi}, \quad (5a)$$

$$\tan\beta = \frac{V_\beta \sin\psi}{V_\alpha + V_\beta \cos\psi}. \quad (5b)$$

It is useful to solve for $\alpha$ and $\beta$ at this stage because these variables are also used in the next step to estimate the aperture. However, it is also possible to forgo the solution for $\alpha$ and $\beta$ at this stage and solve for the bandwidth required for a specified vertical resolution directly using the scattering angle instead:

$$BW \geq \frac{V_\alpha V_\beta}{2R_v(V_\beta^2 + 2V_\alpha V_\beta \cos\psi + V_\alpha^2)^{1/2}}. \quad (6)$$

The bandwidth relations above hold for the noise-free Ricker wavelet. Because the actual wavelet typically realized in seismic data is not exactly a Ricker wavelet and not perfectly noise-free, a somewhat larger bandwidth may actually be required to achieve the vertical resolution objective. A range is typically considered up to twice the minimum required bandwidth. The appropriate value within this range is often determined by experience with seismic surveys in the same geographical regions and under the same conditions, or by other empirical means.

It is sometimes useful to consider parameterization of the above relations in terms of the propagation velocity of the incident seismic wave, $V_\alpha$, and the ratio of the propagation velocities of the incident and reflected (or scattered) seismic waves, respectively, $\gamma=V_\alpha/V_\beta$. In this case, each of the above relations is written in the form:

$$R_v \geq \frac{V_\alpha}{2BW(\cos\alpha + \gamma\cos\beta)}, \quad (7a)$$

$$BW \geq \frac{V_\alpha}{2R_v(\cos\alpha + \gamma\cos\beta)}, \quad (7b)$$

$$\tan\alpha = \frac{\gamma\sin\psi}{1+\gamma\cos\psi}, \quad (7c)$$

$$\tan\beta = \frac{\sin\psi}{\gamma+\cos\psi}, \quad (7d)$$

$$BW \geq \frac{V_\alpha}{2R_v(1+2\gamma\cos\psi+\gamma^2)^{1/2}}. \quad (7e)$$

It may be noted that by considering the case for the incident seismic wave propagation velocity equal to the reflected (or scattered) seismic wave propagation velocity, $V_\alpha=V_\beta$, or $\gamma=1$, and the backscatter condition, $\alpha=\beta=\psi=0$, the equations for the common mode case result.

ii) Determine the Migration Acceptance Angle and Corresponding Source and Receiver Apertures Required to Achieve the Specified Lateral Seismic Resolution at the Target Depth (Step 182).

Given the specified lateral resolution at the target depth, $R_{lm}$, the relationship with migration acceptance angle, $\theta_\alpha$, is given by $$R_{lm} \approx \frac{R_v}{\sin\theta_a} \quad (8)$$

Consequently, the minimum required migration acceptance angle is determined by $\theta_\alpha \approx \arcsin(R_v/R_{lm})$. Once the minimum required migration acceptance angle is determined, ray tracing may be used to determine the corresponding aperture. Two rays are traced to the surface of the velocity model. One ray represents the incident seismic wave and one ray represents the reflected (or scattered) seismic wave. The lateral distance between the starting point of the incident ray path and the ending point of the incident ray path is the source aperture, and the lateral distance between the starting point of the reflected (or scattered) ray path and the ending point of the reflected (or scattered) ray path is the receiver aperture. The source aperture describes the region on the earth's surface beyond the surface area overlying the image area where sources need to be distributed in order to capture the migration acceptance angle for all points in the image area, while the receiver aperture describes the region on the earth's surface beyond the surface area overlying the image area where receivers need to be distributed in order to capture the migration acceptance angle for all points in the image area. For one orientation, the incident ray has a take-off angle from the vertical of $\theta_\alpha+\alpha$, and the reflected (or scattered) ray has a take-off angle from the vertical of $\theta_\alpha+\beta$. The incident ray is traced through the velocity model of the earth corresponding to the $V_\alpha$ propagation velocity, while the reflected (or scattered) ray is traced through the velocity model of the earth corresponding to the $V_\beta$ propagation velocity. For another orientation, the incident ray has a take-off angle from the vertical of $\theta_\alpha+\alpha$, and the reflected (or scattered) ray has a take-off angle from the vertical of $\theta_\alpha-\beta$. Again, the incident ray is traced through the velocity model of the earth corresponding to the $V_\alpha$ propagation velocity, while the reflected (or scattered) ray is traced through the velocity model of the earth corresponding to the $V_\beta$ propagation velocity. Other orientations are possible where the azimuth of the source-receiver pair is neither parallel nor antiparallel to the direction in which aperture is being solved, but is at some oblique angle. Ray tracing can also be used to solve for oblique cases. However, for the case where the azimuth of the source-receiver pair is perpendicular to the direction of aperture, an arithmetic average of both the source and receiver apertures for both parallel and antiparallel orientations provides a good approximation that is valid for both the source and receiver apertures.

It may be noted that by considering the case for the incident seismic wave propagation velocity equal to the reflected (or scattered) seismic wave propagation velocity, $V_\alpha = V_\beta$, or $\gamma=1$, and the backscatter condition, $\alpha=\beta=\psi=0$, the above procedure describes the zero offset, common mode aperture solution.

iii) Determine the Bin Size Required to Avoid Aliasing the Seismic Wave Returned from the Target Depth (Step 183).

It is typical practice to implement seismic imaging algorithms in the common offset domain; that is, on seismic data associated with a single offset or small range of offsets. A seismic trace (i.e., a time recording of seismic data associated with a single receiver and a single source) may be referenced by the midpoint between the corresponding source and receiver locations. The seismic traces with a common offset may be spatially arranged according to their midpoints. Spatial bins may be defined for a common offset, and seismic traces whose midpoints are within the boundaries of a bin are assigned to that bin. In order to avoid aliasing when applying an imaging algorithm to common offset seismic data, all bins must be occupied by at least one trace and the bin size must not exceed $$\Delta x \leq \frac{V_\alpha V_\beta}{2(V_\beta \cos\alpha + V_\alpha \cos\beta) f_{max} \sin\theta_a}, \quad (9)$$

where $f_{max}$ is the largest frequency required to achieve the bandwidth requirement determined in step 181, $\theta_\alpha$ is the migration acceptance angle requirement determined in step 182, $V_\alpha$ is the propagation velocity of the incident seismic wave at the target depth, $V_\beta$ is the propagation velocity of the reflected (or scattered) seismic wave at the target depth, $\alpha$ is the angle of incidence, and $\beta$ is the angle of reflection; or, put another way, $\alpha$ is the angle between the wavenumber vector of the incident seismic wave and the spatial gradient of the two-way travel time function, and $\beta$ is the angle between the negative of the wavenumber vector of the reflected (or scattered) seismic wave and the spatial gradient of the two-way travel time function. The maximum allowed bin size is given by the equality. The bin size requirement may also be written in terms of the scattering angle between the incident and reflected (or scattered) seismic waves, denoted $\psi$, which is the sum of $\alpha$ and $\beta$:

$$\Delta x \leq \frac{V_\alpha V_\beta}{2(V_\beta^2 + 2V_\alpha V_\beta \cos\psi + V_\alpha^2)^{1/2} f_{max} \sin\theta_a}. \quad (10)$$

The smallest scattering angle associated with a given common offset may be inserted into the bin size requirement equation to give the most restrictive bin size requirement for that common offset. It is possible to determine the smallest scattering angle of interest independent of common offset, and insert that value to obtain the maximum allowed bin size. In many cases, the bin size requirement is desired for all offsets in a seismic survey, from zero up to the maximum offset, that also includes small scattering angles, even down to zero degrees. In this case, the bin size requirement equation becomes $$\Delta x \leq \frac{V_\alpha V_\beta}{2(V_\beta + V_\alpha) f_{max} \sin\theta_a}. \quad (11)$$

The bin size requirement is subsequently used to determine the maximum intervals between source stations and between receiver stations that are allowed when acquiring the seismic survey.

It is sometimes useful to consider parameterization of the bin size equation in terms of the propagation velocity of the incident seismic wave, $V_\alpha$, and the ratio of the propagation velocities of the incident and reflected (or scattered) seismic waves, respectively, $\gamma = V_\alpha/V_\beta$. In this case, each of the above relations is written in the form:

$$\Delta x \leq \frac{V_\alpha}{2(\cos\alpha + \gamma\cos\beta) f_{max} \sin\theta_a}. \quad (12a)$$

$$\Delta x \leq \frac{V_\alpha}{2(1 + 2\gamma\cos\psi + \gamma^2)^{1/2} f_{max} \sin\theta_a}. \quad (12b)$$

$$\Delta x \leq \frac{V_\alpha}{2(1 + \gamma) f_{max} \sin\theta_a}. \quad (12c)$$

It may be noted that by considering the case for the incident seismic wave propagation velocity equal to the reflected (or scattered) seismic wave propagation velocity, $V_\alpha = V_\beta$, or $\gamma=1$, and the backscatter condition, $\alpha=\beta=\psi=0$, the equations for the common mode case result. (For common-mode surveys, maximum reflected energy typically occurs at the backscatter condition. Equations (1) and (3) are valid only for this condition.) Derivations of Eqs. (4)-(12) are provided in the Appendix.

Design of a PS survey is simply a matter of substituting $V_\alpha = V_P$ and $V_\beta = V_S$ into Eqs. (4)-(12c) and Snell's law, and the reverse for an SP survey. Since the equations are symmetric in their dependence on $V_\alpha$ and $V_\beta$, the design numbers will be the same for PS as for SP; however, the PS source aperture becomes the SP receiver aperture and the PS receiver aperture becomes the SP source aperture. Conventional sources may be used in converted mode surveys, and the same is true for receivers except that air guns will not source S-wave energy in a fluid medium and hydrophones will not detect S-wave energy. Persons skilled in the art of seismic surveying will know various techniques to enhance a chosen mode. Most modern sonic logging to techniques provide both P and S-wave velocities, at least over the logged interval. The PS survey is discussed in more detail next.

One application of the invention is the design of a PS reflection seismology survey to achieve specified resolution objectives. A PS reflection seismology survey is a converted mode reflection seismology survey in which a P wave is excited by the source and propagates into the earth, and an S-wave is reflected (or scattered) back from the earth and recorded by receivers. The specified vertical and lateral resolution objectives are given by $R_v$ and $R_{lm}$, respectively. The velocity model of the earth where the survey is to be conducted consists of a laterally homogeneous compressional wave (P-wave) velocity profile and a laterally homogeneous shear wave (S-wave) velocity profile. The P wave and S wave propagation velocities at the target depth are given by $V_p$ and $V_s$, respectively. The invention is used to determine the minimum required bandwidth, migration acceptance angle, source and receiver apertures, and maximum allowed bin size for the survey.

i) Determine the Bandwidth Required to Achieve the Specified Vertical Seismic Resolution at the Target Depth.

The required bandwidth is determined by Eqn. (4) with $V_\alpha = V_P$ and $V_\beta = V_S$:

$$BW \geq \frac{V_p V_s}{2R_v(V_s \cos\alpha + V_p \cos\beta)},$$

where $\alpha$ is the angle of incidence, and $\beta$ is the angle of reflection. Or, put another way, $\alpha$ is the angle between the wavenumber vector of the incident seismic wave and the spatial gradient of the two-way travel time function, and $\beta$ is the angle between the negative of the wavenumber vector of the reflected (or scattered) seismic wave and the spatial gradient of the two-way travel time function. The minimum required bandwidth is given by the equality. The added variables $\alpha$ and $\beta$ require the survey designer to choose some finite incident or scattering angle, where the scattering angle is $\psi = \alpha + \beta$, that is to be considered. A study of the property contrasts that cause the reflected (or scattered) seismic waves may be pursued to identify scattering angles that return the most useful energy; e.g., an amplitude-versus-angle analysis. If property contrast information is unavailable or incomplete, it may be appropriate to assume a scattering angle at, or near, 45 degrees will return sufficient energy and is, therefore, appropriate to consider for survey design. Another approach may be to identify the offsets for which maximum energy is returned, and then determine the corresponding scattering angle by ray tracing. Once the survey designer has determined what angle of incidence, $\alpha$, is important for the design, the angle of reflection, $\beta$, may be determined from Snell's law. Or, if the survey designer has decided what scattering angle is important for the design, the angles $\alpha$ and $\beta$ are determined from the relations 5(a) and 5(b):

$$\tan\alpha = \frac{V_p \sin\psi}{V_s + V_p \cos\psi},$$

$$\tan\beta = \frac{V_s \sin\psi}{V_p + V_s \cos\psi}.$$

It is useful to solve for $\alpha$ and $\beta$ using the above relations because these variables are also used in the next step to estimate the aperture. However, it is also possible to forgo the solution for $\alpha$ and $\beta$ at this stage and solve for the bandwidth required for a specified vertical resolution directly using the scattering angle instead, i.e. apply Eqn. (6):

$$BW \geq \frac{V_p V_s}{2R_v(V_p^2 + 2V_p V_s \cos\psi + V_s^2)^{1/2}}$$

The bandwidth relations above hold for the noise-free Ricker wavelet. Because the actual wavelet typically realized in seismic data is not exactly a Ricker wavelet and not perfectly noise-free, a somewhat larger bandwidth may actually be required to achieve the vertical resolution objective. A range is typically considered up to twice the minimum required bandwidth. The appropriate value within this range is often determined by experience with seismic surveys in the same geographical regions and under the same conditions, or by other empirical means.

It is sometimes useful to consider parameterization of the above relations in terms of the propagation velocity of the incident seismic wave, $V_p$, and the ratio of the propagation velocities of the incident and reflected (or scattered) seismic waves, respectively, $\gamma = V_p/V_s$. In this case, using Eqs. (7b)-(7e), each of the above relations is written in the form:

$$BW \geq \frac{V_p}{2R_v(\cos\alpha + \gamma\cos\beta)},$$

$$\tan\alpha = \frac{\gamma\sin\psi}{1 + \gamma\cos\psi},$$

$$\tan\beta = \frac{\sin\psi}{\gamma + \cos\psi},$$

$$BW \geq \frac{V_p}{2R_v(1 + 2\gamma\cos\psi + \gamma^2)^{1/2}}.$$

ii) Determine the Migration Acceptance Angle and Corresponding Source and Receiver Apertures Required to Achieve the Specified Lateral Seismic Resolution at the Target Depth.

Given the specified lateral resolution at the target depth, $R_{lm}$, the relationship with migration acceptance angle, $\theta_a$, is given by Eqn. (8):

$$R_{lm} \approx \frac{R_v}{\sin\theta_a}.$$

Consequently, the minimum required migration acceptance angle is determined by $\theta_a \approx \arcsin(R_v/R_{lm})$. Once the minimum required migration acceptance angle is determined, ray tracing may be used to determine the corresponding aperture. Two rays are traced to the surface of the velocity model. One ray represents the incident seismic wave and one ray represents the reflected (or scattered) seismic wave. The lateral distance between the starting point of the incident ray path and the ending point of the incident ray path is the source aperture, and the lateral distance between the starting point of the reflected (or scattered) ray path and the ending point of the reflected (or scattered) ray path is the receiver aperture. The source aperture describes the region on the earth's surface beyond the surface area overlying the image area where sources need to be distributed in order to capture the migration acceptance angle for all points in the image area, while the receiver aperture describes the region on the earth's surface beyond the surface area overlying the image area where receivers need to be distributed in order to capture the migration acceptance angle for all points in the image area. For one orientation, the incident ray has a take-off angle from the vertical of $\theta_a - \alpha$, and the reflected (or scattered) ray has a take-off angle from the vertical of $\theta_a + \beta$. The incident ray is traced through the compressional wave velocity model of the earth corresponding to the $V_p$ propagation velocity, while the reflected (or scattered) ray is traced through the shear wave velocity model of the earth corresponding to the $V_s$ propagation velocity. For another orientation, the incident ray has a take-off angle from the vertical of $\theta_\alpha+\alpha$, and the reflected (or scattered) ray has a take-off angle from the vertical of $\theta_\alpha-\beta$. Again, the incident ray is traced through the compressional wave velocity model of the earth corresponding to the $V_p$ propagation velocity, while the reflected (or scattered) ray is traced through the shear wave velocity model of the earth corresponding to the $V_s$ propagation velocity. Other orientations are possible where the azimuth of the source —receiver pair is neither parallel nor antiparallel to the direction in which aperture is being solved, but is at some oblique angle. Ray tracing can also be used to solve for oblique cases. However, for the case where the azimuth of the source-receiver pair is perpendicular to the direction of aperture, an arithmetic average of both the source and receiver apertures for both parallel and antiparallel solutions provides a good approximation that is valid for both the source and receiver apertures.

iii) Determine the Bin Size Required to Avoid Aliasing the Seismic Wave Returned from the Target Depth.

It is typical practice to implement seismic imaging algorithms in the common offset domain; that is, on seismic data associated with a single offset or small range of offsets. A seismic trace (i.e., a time recording of seismic data associated with a single receiver and a single source) may be referenced by the midpoint between the corresponding source and receiver locations. The seismic traces with a common offset may be spatially arranged according to their midpoints. Spatial bins may be defined for a common offset, and seismic traces whose midpoints are within the boundaries of a bin are assigned to that bin. In order to avoid aliasing when applying an imaging algorithm to common offset seismic data, all bins must be occupied by at least one trace and the bin size must not exceed the value given by Eqn. (9):

$$\Delta x \leq \frac{V_p V_s}{2(V_s \cos\alpha + V_p \cos\beta) f_{max} \sin\theta_a}, \quad (9)$$

where $f_{max}$ is the largest frequency required to achieve the bandwidth requirement determined in the first step, $\theta_\alpha$ is the migration acceptance angle requirement determined in the second step, $V_p$ is the propagation velocity of the incident seismic wave at the target depth, $V_s$ is the propagation velocity of the reflected (or scattered) seismic wave at the target depth, $\alpha$ is the angle of incidence, and $\beta$ is the angle of reflection; or, put another way, $\alpha$ is the angle between the wavenumber vector of the incident seismic wave and the spatial gradient of the two-way travel time function, and $\beta$ is the angle between the negative of the wavenumber vector of the reflected (or scattered) seismic wave and the spatial gradient of the two-way travel time function. The maximum allowed bin size is given by the equality. The bin size requirement may also be written as in Eqn. (10) in terms of the scattering angle between the incident and reflected (or scattered) seismic waves, denoted $\psi$, which is the sum of $\alpha$ and $\beta$:

$$\Delta x \leq \frac{V_p V_s}{2(V_p^2 + 2V_p V_s \cos\psi + V_s^2)^{1/2} f_{max} \sin\theta_a}.$$

The smallest scattering angle associated with a given common offset may be inserted into the bin size requirement equation to give the most restrictive bin size requirement for that common offset. It is possible to determine the smallest scattering angle of interest independent of common offset, and insert that value to obtain the maximum allowed bin size. In many cases, the bin size requirement is desired for all offsets in a seismic survey, from zero up to the maximum offset, that also includes small scattering angles, even down to zero degrees. In this case, Eqn. (11) gives the bin size requirement:

$$\Delta x \leq \frac{V_p V_s}{2(V_p + V_s) f_{max} \sin\theta_a}.$$

The bin size requirement is subsequently used to determine the maximum intervals between source stations and between receiver stations that are allowed when acquiring the seismic survey.

It is sometimes useful to consider parameterization of the bin size equation in terms of the propagation velocity of the incident seismic wave, $V_p$, and the ratio of the propagation velocities of the incident and reflected (or scattered) seismic waves, respectively, $\gamma=V_p/V_s$. In this case, each of the above relations is written in the form given in Eqs. (12a)-(12c):

$$\Delta x \leq \frac{V_p}{2(\cos\alpha + \gamma\cos\beta) f_{max} \sin\theta_a}.$$

$$\Delta x \leq \frac{V_p}{2(1 + 2\gamma\cos\psi + \gamma^2)^{1/2} f_{max} \sin\theta_a}.$$

$$\Delta x \leq \frac{V_p}{2(1 + \gamma) f_{max} \sin\theta_a}.$$

EXAMPLES

The following examples are included to demonstrate some applications of the invention, but are not intended as a comprehensive or exhaustive representation of all circumstances of how the invention may be applied.

Example 1

A PS converted wave seismic survey is desired to image a depth of 3000 meters over a square area that is 4000 meters on each side, the sides of the square aligned along east-west and north-south directions. The survey orientation is such that source and receiver offsets have predominantly east-west and west-east azimuths. The earth is well approximated by a layered compressional velocity model given by a propagation velocity of 1500 meters per second from the surface to a depth of 1000 meters, 2000 meters per second from 1000 to 2000 meters depth, and 2500 meters per second below 2000 meters depth; and a layered shear velocity model given by a propagation velocity of 500 meters per second from the surface to a depth of 1000 meters, 1000 meters per second from 1000 to 2000 meters depth, and 1500 meters per second below 2000 meters depth. No independent information on the energy distribution with scattering angle is available, nor has any range of incident angles been specified as an objective (e.g.; as might be done for amplitude-versus-offset analysis). The desired vertical resolution is 20 meters and the desired lateral resolution is 40 meters.

i) Determine the Bandwidth Required to Achieve the Specified Vertical Seismic Resolution at the Target Depth.

Since no specific scattering or incident angle is identified that gives the greatest energy response, it is assumed that a scattering angle of 45 degrees provides a strong energy response that will contribute substantially to the image. The required bandwidth is determined by $$BW \geq \frac{V_p V_s}{2R_v(V_p^2 + 2V_p V_s \cos\psi + V_s^2)^{1/2}}.$$

Evaluating, the required bandwidth is given by $$BW \geq \frac{2500 \cdot 1500}{2 \cdot 20(2500^2 + 2 \cdot 2500 \cdot 1500\cos 45° + 1500^2)^{1/2}} \cong 25.2.$$

The velocities at the target depth are the appropriate values to use in the equations of the present inventive method. Thus, a bandwidth of at least 25.2 Hz. is required to achieve the specified vertical resolution. An alternative approach to the solution is to use the relation $$BW \geq \frac{V_p}{2R_v(1 + 2\gamma\cos\psi + \gamma^2)^{1/2}},$$

and noting that $\gamma = 2500/1500 = 5/3$, $$BW \geq \frac{2500}{2 \cdot 20(1 + 2(5/3)\cos 45° + (5/3)^2)^{1/2}} \cong 25.2.$$

Though solutions for the angles of incidence and reflection are not required at this stage, they are required for the next stage. The angles can be solved first and used in computing the bandwidth requirement. The relations are, $$\tan\alpha = \frac{V_p \sin\psi}{V_s + V_p \cos\psi},$$

$$\tan\beta = \frac{V_s \sin\psi}{V_p + V_s \cos\psi}.$$

Evaluating, the incident and reflected angles are given by $$\alpha = \arctan\frac{2500\sin 45°}{1500 + 2500\cos 45°} \cong 28.4°,$$

$$\beta = \arctan\frac{1500\sin 45°}{2500 + 1500\cos 45°} \cong 16.6°.$$

Alternatively, the following relations can be used $$\tan\alpha = \frac{\gamma\sin\psi}{1 + \gamma\cos\psi},$$

$$\tan\beta = \frac{\sin\psi}{\gamma + \cos\psi},$$

which, upon evaluating, gives the incident and reflection angles $$\alpha = \arctan\frac{(5/3)\sin 45°}{1 + (5/3)\cos 45°} \cong 28.4°,$$

$$\beta = \arctan\frac{\sin 45°}{(5/3) + \cos 45°} \cong 16.6°.$$

The incident and reflection angles may be used to solve for the bandwidth requirement using the relation $$BW \geq \frac{V_p V_s}{2R_v(V_s\cos\alpha + V_p\cos\beta)},$$

which, upon evaluating gives $$BW \geq \frac{2500 \cdot 1500}{2 \cdot 20(1500\cos 28.4° + 2500\cos 16.6°)} \cong 25.2,$$

or by using the relation $$BW \geq \frac{V_p}{2R_v(\cos\alpha + \gamma\cos\beta)},$$

which, upon evaluating gives $$BW \geq \frac{2500}{2 \cdot 20(\cos 28.4° + (5/3)\cos 16.6°)} \cong 25.2.$$

In this case, it is expected that excellent wavelet control and large signal-to-noise power ratios are achievable for the survey. Therefore, the recommended bandwidth objective for the survey is the minimum required bandwidth of 25.2 Hz.

ii) Determine the Migration Acceptance Angle and Corresponding Source and Receiver Apertures Required to Achieve the Specified Lateral Seismic Resolution at the Target Depth.

The minimum required migration acceptance angle is determined by $$\theta_a \approx \arcsin\frac{R_v}{R_{lm}}.$$

Evaluating, the required migration acceptance angle is given by $$\theta_a \approx \arcsin\frac{20}{40} = 30°.$$

Once the minimum required migration acceptance angle is determined, ray tracing may be used to determine the corresponding aperture. For purposes of this example, it has previously been decided that imaging of both east-west and west-east orientations of source-receiver pairs is to be pursued.

An aperture that will capture the required migration acceptance angle for each edge of the image area must now be determined. (See FIG. 1.) First, the aperture for the western edge 16 of the image area 51 is considered. Two rays are traced to the surface 13 of the velocity model of the earth. One ray (11) represents the incident seismic wave and one ray (12) represents the reflected (or scattered) seismic wave. For one orientation, the takeoff angle from the vertical 19 for the incident ray is given by $\theta_\alpha-\alpha$, and the takeoff angle from the vertical for the reflected (or scattered) ray is given by $\theta_\alpha+\beta$. The migration acceptance angle is 30° from the vertical directed westward; i.e., away from the image area, and the incident and reflection angles are 28.4° and 16.6°, respectively. Evaluating, the two takeoff angles are 30°−28.4°=1.6° and 30°+16.6°=46.6° from the vertical directed westward. The ray representing the incident seismic wave begins at a depth of 3000 meters and a takeoff angle of 1.6° westward from the vertical, and is ray traced upward through the compressional (assuming a P-S survey) wave velocity model of the earth to the surface, as illustrated by 11 in FIG. 1. The end point of the ray trace represents a source location 17, and the lateral distance between start point and the end point of the ray is the source aperture 15 required for the western edge of the image area. In this case, the ray trace solution gives a source aperture of 67 meters. The ray representing the reflected (or scattered) seismic wave begins at a depth of 3000 meters and a takeoff angle of 46.6° westward from the vertical, and is ray traced upward through the shear wave velocity model of the earth to the surface, as illustrated by 12 in FIG. 1. The end point of the ray trace represents a receiver location 18, and the lateral distance between start point and the end point of the ray is the receiver aperture 14 required for the western edge of the image area. In this case, the ray trace solution gives a receiver aperture of 1860 meters.

Figure 2:
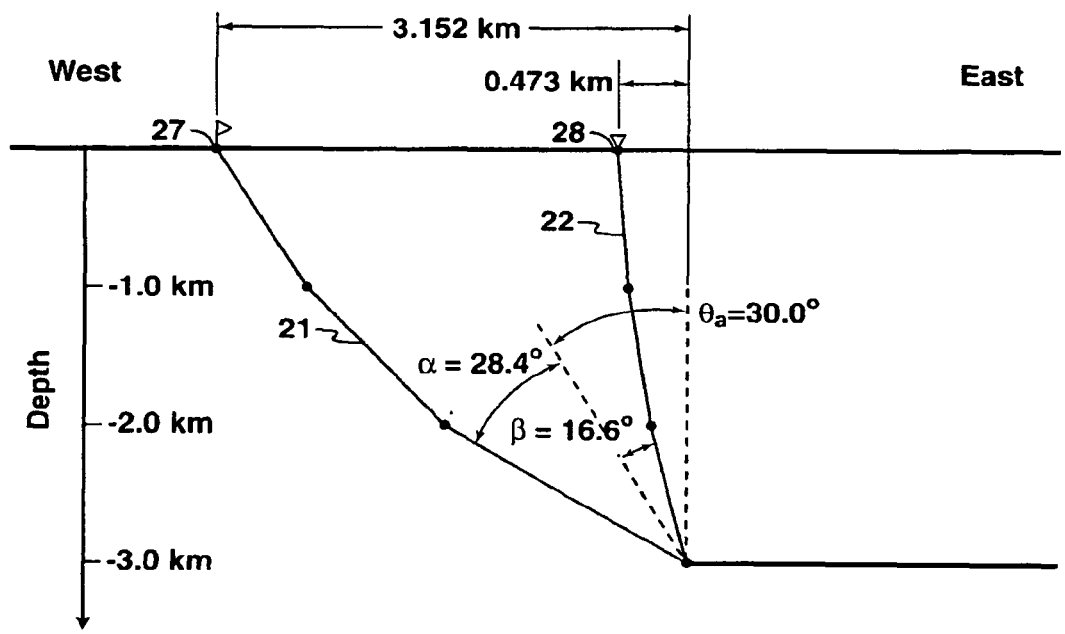

Because it has been previously decided that imaging of both east-west (i.e., source lies east of receiver) and west-east orientations of source-receiver pairs is to be pursued, aperture requirements for both orientations must be satisfied. For the other orientation (see FIG. 2), the takeoff angle from the vertical for the incident ray 21 is given by $\theta_\alpha+\alpha$, and the takeoff angle from the vertical for the reflected (or scattered) ray 22 is given by $\theta_\alpha-\beta$. The migration acceptance angle is 30° from the vertical directed westward; i.e., away from the image area, and the incident and reflection angles are 28.4° and 16.6°, respectively. Evaluating, the two takeoff angles are 30°+28.4°=58.4° and 30°−16.6°=13.4° from the vertical directed westward. The ray representing the incident seismic wave begins at a depth of 3000 meters and a takeoff angle of 58.4° westward from the vertical, and is ray traced upward through the compressional wave velocity model of the earth to the surface, as illustrated in FIG. 2. The end point of the ray trace represents a source location 27, and the lateral distance between start point and the end point of the ray is the source aperture required for the western edge of the image area. In this case, the ray trace solution gives a source aperture of 3152 meters. The ray representing the reflected (or scattered) seismic wave begins at a depth of 3000 meters and a takeoff angle of 13.4° westward from the vertical, and is ray traced upward through the shear wave velocity model of the earth to the surface, as illustrated in FIG. 2. The end point of the ray trace represents a receiver location 28, and the lateral distance between start point and the end point of the ray is the receiver aperture required for the western edge of the image area. In this case, the ray trace solution gives a receiver aperture of 473 meters.

Figure 3:
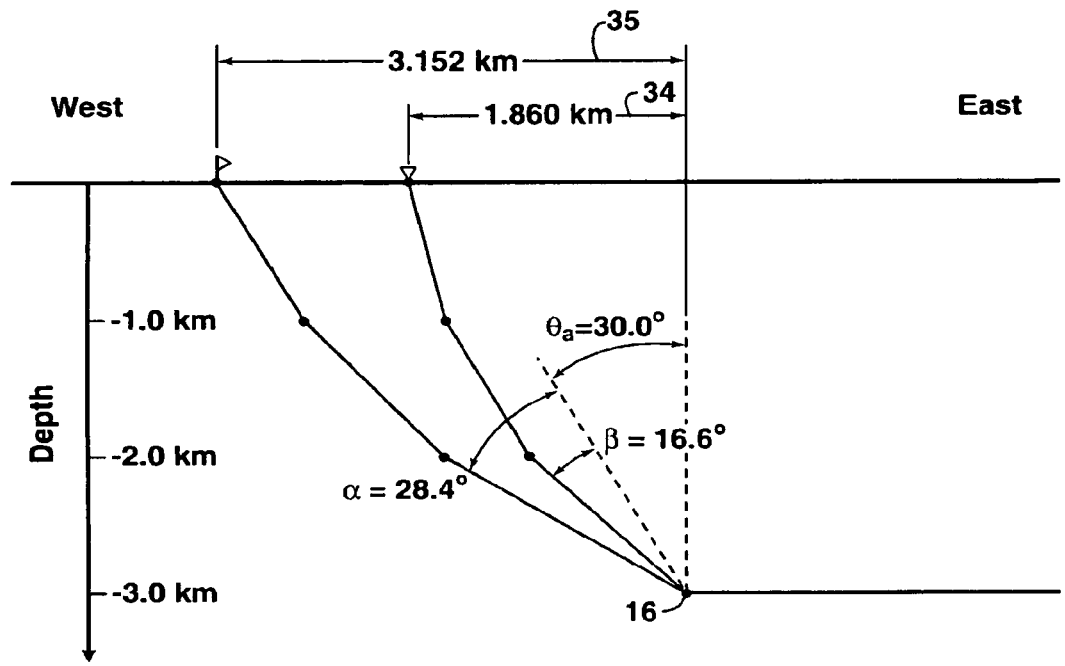

In order to meet the aperture requirements for both orientations, the largest source and receiver apertures from both orientations are required. In this case, the source aperture 35 required for the western edge of the image area is 3152 meters, and the receiver aperture 34 required for the western edge of the image area is 1860 meters (see FIG. 3).

Figure 4:
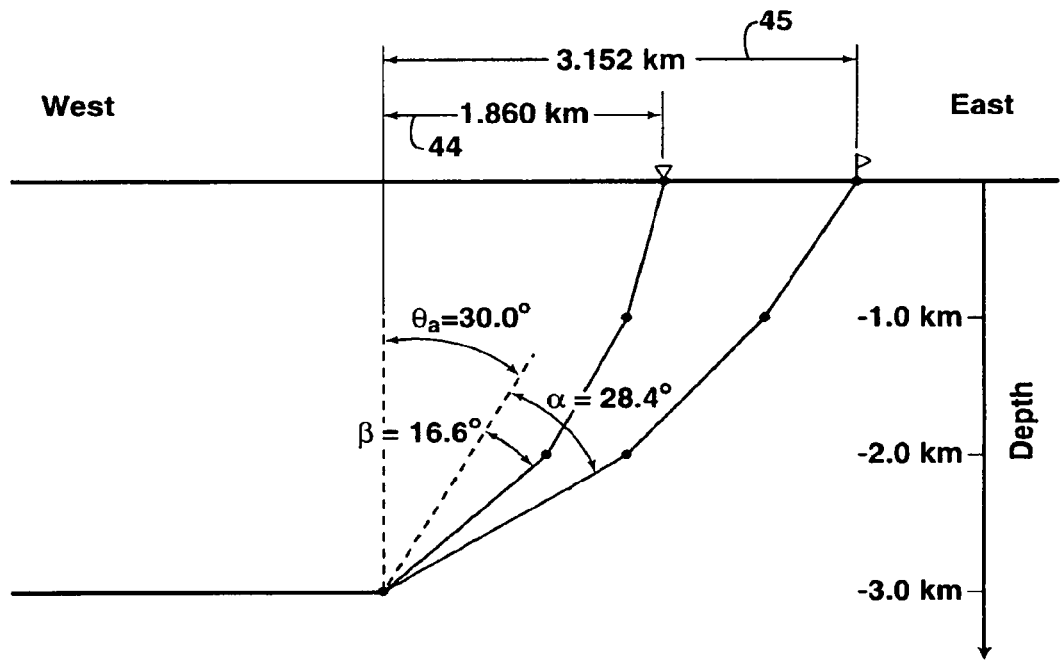

The aperture solution for the eastern edge of the image area is an exact mirror representation of the aperture solution of the western edge of the image area. Hence, the source aperture 45 required for the eastern edge of the image area is 3152 meters, and the receiver aperture 44 required for the eastern edge of the image area is 1860 meters (see FIG. 4).

Figure 5:
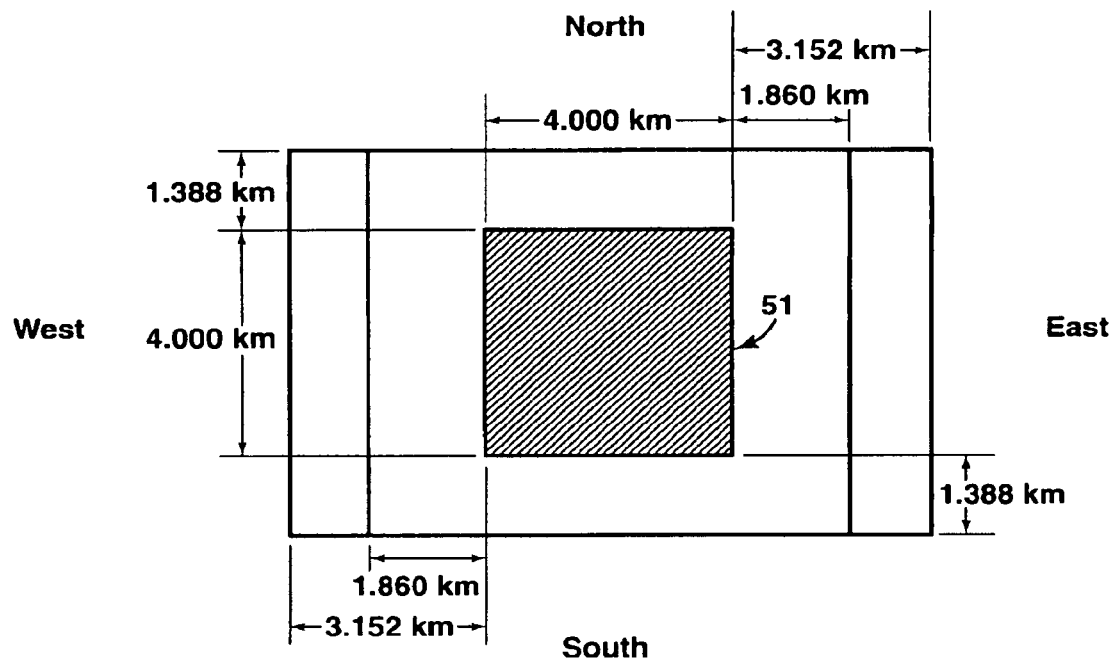

The aperture solutions for the northern and southern edges could also be solved by ray tracing, but the ray tracing would have to be done in three dimensions instead of the 2D ray tracing that serves for the eastern and western edges. However, a good approximation of the aperture solution for the northern and southern edges is given by an arithmetic average of both the source and receiver apertures for both the east-west and west-east azimuth solutions. Hence, an approximate solution for the source and receiver apertures for the northern and southern edges of the image area is given by (67+1860+3152+473)/4=1388 meters. A summary of the source and receiver aperture requirements for all edges of the image area 51 is summarized in FIG. 5.

iii) Determine the Bin Size Required to Avoid Aliasing the Seismic Wave Returned from the Target Depth.

Figure 17:
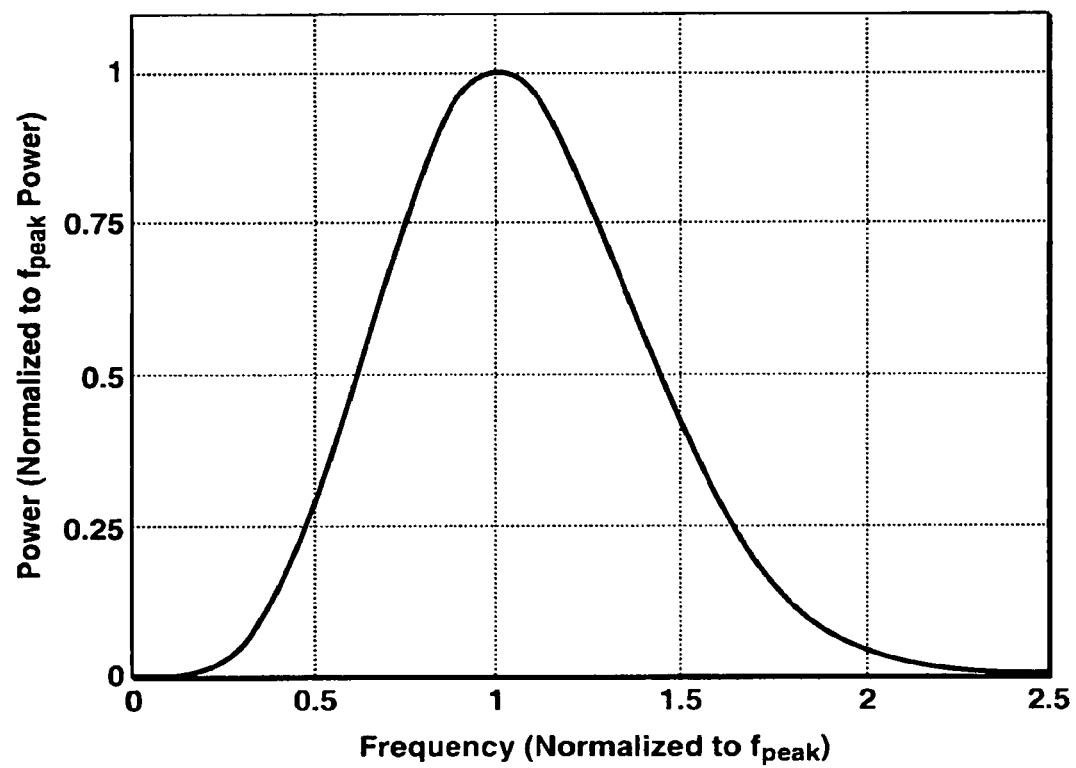
FIG. 17 shows the power spectrum for a Ricker wavelet.

In the first step, the required bandwidth was determined to be 25.2 Hz. Those skilled in the art of seismic survey design can determine the largest frequency required to achieve the specified bandwidth. One approach is to consider that all frequencies within the bandwidth must be acquired; hence, in such an embodiment of the invention, all frequencies between the half power frequencies of the Ricker power spectrum must be acquired. (FIG. 17 shows the spectrum for the Ricker wavelet.) Then the largest frequency is the upper half power frequency of the Ricker power spectrum. It is known that the half power frequencies of the Ricker power spectrum are given by $$(f_{hp})_{lo} \cong 0.617 f_{peak},$$

$$(f_{hp})_{hi} \cong 1.44 f_{peak},$$

where $(f_{hp})_{lo}$ is the lower half power frequency, $(f_{hp})_{hi}$ is the upper half power frequency, and $f_{peak}$ is the peak power frequency of the Ricker wavelet. Consequently, the bandwidth is given by $$BW \cong 0.825 f_{peak},$$

and the upper half power frequency can be expressed in terms of the bandwidth by the relation $$(f_{hp})_{lo} \cong 1.75 BW$$

In this example, the largest frequency required to achieve the specified bandwidth of 25.2 Hz. is given by $$f_{max} = (f_{hp})_{hi} \cong 1.75 BW \cong 44.1.$$

Using a previously given formula, the bin size required to avoid aliasing is given by $$\Delta x \leq \frac{V_p}{2(1 + 2\gamma\cos\psi + \gamma^2)^{1/2} f_{max} \sin\theta_a}.$$

Evaluating for a maximum frequency of 44.1 Hz., a migration acceptance angle of 30°, and a scattering angle of 45° gives $$\Delta x \le \frac{2500}{2(1 + 2(5/3)\cos 45° + (5/3)^2)^{1/2} 44.1 \sin 30°} \cong 22.9.$$

While a bin size of 22.9 meters is sufficient to avoid aliasing 44.1 Hz. given a migration acceptance angle of 30° and a scattering angle of 45°, it is often desired that scattering angles smaller than 45° are also acquired without aliasing. In other words, it may still be useful to ensure that the energy returned at small scattering angles is not aliased. To ensure no aliasing, independent of scattering angle, the required bin size is given by $$\Delta x \le \frac{V_p}{2(1+\gamma)f_{max}\sin\theta_a}.$$

Evaluating the relation gives $$\Delta x \le \frac{2500}{2(1 + (5/3))44.1 \sin 30°} \cong 21.3.$$

Hence, a bin size no greater than 21.3 meters is needed to avoid aliasing 44.1 Hz. given a migration acceptance angle of 30° for any scattering angle. Those skilled in the art of seismic survey design can use the required bin size to determine corresponding maximum intervals between source stations and between receiver stations that are allowed when acquiring the seismic survey; see, for example, pages 13-37 in *Planning Land 3-D Seismic Surveys* by Cordsen, et al.

Example 2

This example is the same as Example 1, except it has been specified that the maximum offset to be acquired for the survey is 3000 meters, and that this offset contains more converted mode seismic energy than smaller offsets. Since scattering angle is related to offset, the maximum offset sets the maximum scattering angle that will be acquired.

i) Determine the Bandwidth Required to Achieve the Specified Vertical to Seismic Resolution at the Target Depth.

In this case, the offset of 3000 meters has been identified as the maximum offset to be acquired by the survey and that this offset contains the most converted mode energy. Therefore, the survey designer has chosen to base the bandwidth requirement on the 3000 meter offset.

First, the scattering angle that corresponds to an offset of 3000 meters is determined by ray tracing. A 3000 meter offset from specular reflection off a horizontal reflector at the target depth corresponds with a scattering angle of 69.0°. This scattering angle is used to solve for the required bandwidth using the formula $$BW \ge \frac{V_p}{2R_v(1 + 2\gamma\cos\psi + \gamma^2)^{1/2}}.$$

Evaluating, the required bandwidth is given by $$BW \ge \frac{2500}{2 \cdot 20(1 + 2(5/3)\cos 69.0° + (5/3)^2)^{1/2}} \cong 28.0.$$

In this case, it is expected that excellent wavelet control and large signal-to-noise power ratios are achievable for the survey. Therefore, the recommended bandwidth objective for the survey is the minimum required bandwidth of 28.0 Hz.

ii) Determine the Migration Acceptance Angle and Corresponding Source and Receiver Apertures Required to Achieve the Specified Lateral Seismic Resolution at the Target Depth.

The minimum required migration acceptance angle is determined by $$\theta_a \approx \arcsin\frac{R_v}{R_{lm}}.$$

Evaluating, the required migration acceptance angle is given by $$\theta_a \approx \arcsin\frac{20}{40} = 30°.$$

Once the minimum required migration acceptance angle is determined, ray tracing may be used to determine the corresponding aperture. It has previously been decided that imaging of both east-west and west-east orientations of source-receiver pairs is to be pursued.

Figure 6:
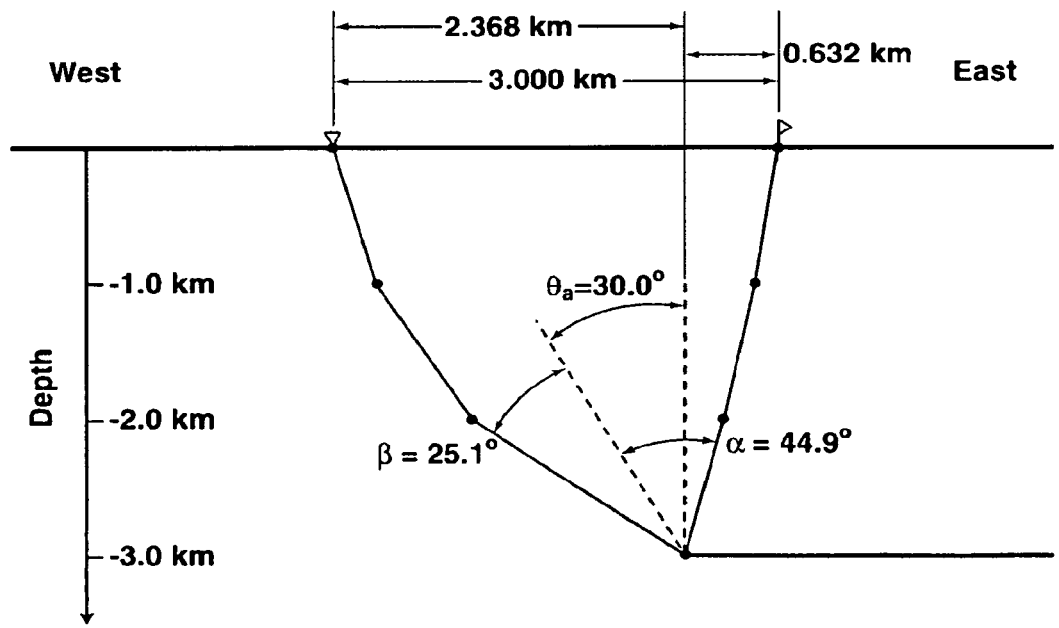
FIGS. 6-10 illustrate determination of migration acceptance angle and corresponding source and receiver apertures in Example 2.

An aperture that will capture the required migration acceptance angle for each edge of the image area must now be determined. First, the aperture for the western edge of the image area is considered. Two rays are traced to the surface of the velocity model of the earth. One ray represents the incident seismic wave and one ray represents the reflected (or scattered) seismic wave. For one orientation, the takeoff angle from the vertical for the incident ray is given by $\theta_a-\alpha$, and the takeoff angle from the vertical for the reflected (or scattered) ray is given by $\theta_a+\beta$. The migration acceptance angle is 30° from the vertical directed westward; i.e., away from the image area. Unlike example 1, where it was desired to solve for the source and receiver apertures for a given scattering angle, this example requires a solution for the source and receiver apertures given a maximum offset of 3000 meters. Iteratively ray tracing the two rays for changing values of α and β (recalling that α and β are related to one another by Snell's law) until an offset of 3000 meters is obtained provides a solution for the source and receiver apertures. In this case, the ray trace solution obtains incident and reflection angles of 44.9° and 25.1°, respectively. Evaluating, the two takeoff angles are 30°−44.9°=−14.9° and 30°+25.1°=55.1° from the vertical directed westward. (Note that −14.9° directed westward is the same as 14.9° directed eastward.) The ray representing the incident seismic wave begins at a depth of 3000 meters and a takeoff angle of 14.9° eastward from the vertical, and is ray traced upward through the compressional wave velocity model of the earth to the surface, as illustrated in FIG. 6. The end point of the ray trace represents a source location, and the lateral distance between start point and the end point of the ray is the source aperture required for the western edge of the image area. In this case, the ray trace solution gives a source aperture of −632 meters. The ray representing the reflected (or scattered) seismic wave begins at a depth of 3000 meters and a takeoff angle of 55.1° westward from the vertical, and is ray traced upward through the shear wave velocity model of the earth to the surface, as illustrated in FIG. 6. The end point of the ray trace represents a receiver location, and the lateral distance between start point and the end point of the ray is the receiver aperture required for the western edge of the image area. In this case, the ray trace solution gives a receiver aperture of 2368 meters.

Figure 7:
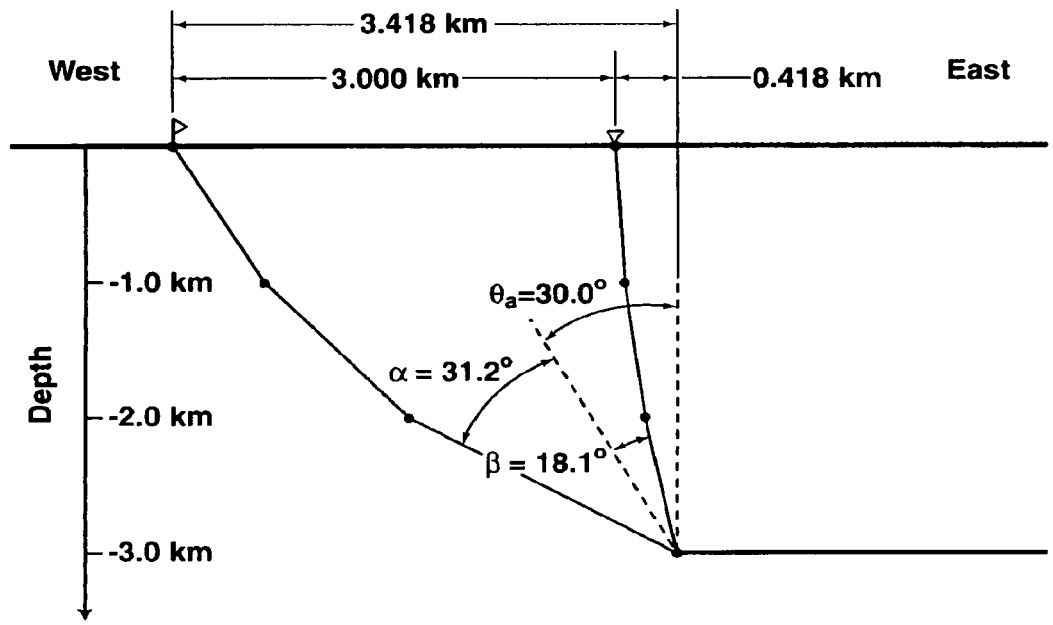

Because it has been previously decided that imaging of both east-west and west-east orientations of source-receiver pairs is to be pursued, aperture requirements for both orientations must be satisfied. For the other orientation, the takeoff angle from the vertical for the incident ray is given by $\theta_a+\alpha$, and the takeoff angle from the vertical for the reflected (or scattered) ray is given by $\theta_a-\beta$. The migration acceptance angle is 30° from the vertical directed westward; i.e., away from the image area. Iteratively ray tracing the two rays for changing values of $\alpha$ and $\beta$ (recalling that $\alpha$ and $\beta$ are related to one another by Snell's law) until an offset of 3000 meters is obtained provides a solution for the source and receiver apertures. In this case, the ray trace solution obtains incident and reflection angles of 31.2° and 18.1°, respectively. Evaluating, the two takeoff angles are 30°+31.2°=61.2° and 30°−18.1°=11.9° from the vertical directed westward. The ray representing the incident seismic wave begins at a depth of 3000 meters and a takeoff angle of 61.2° westward from the vertical, and is ray traced upward through the compressional wave velocity model of the earth to the surface, as illustrated in FIG. 7. The end point of the ray trace represents a source location, and the lateral distance between start point and the end point of the ray is the source aperture required for the western edge of the image area. In this case, the ray trace solution gives a source aperture of 3418 meters. The ray representing the reflected (or scattered) seismic wave begins at a depth of 3000 meters and a takeoff angle of 11.9° westward from the vertical, and is ray traced upward through the shear wave velocity model of the earth to the surface, as illustrated in FIG. 7. The end point of the ray trace represents a receiver location, and the lateral distance between start point and the end point of the ray is the receiver aperture required for the western edge of the image area. In this case, the ray trace solution gives a receiver aperture of 418 meters.

Figure 8:
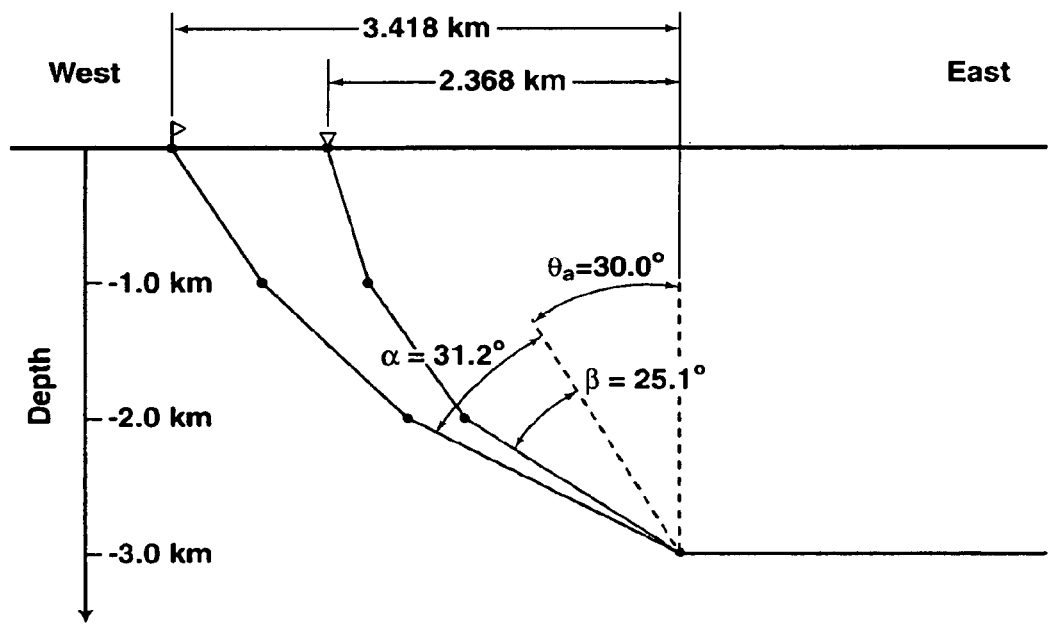

In order to meet the aperture requirements for both orientations, the largest source and receiver apertures from both orientations are required. In this case, the source aperture required for the western edge of the image area is 3418 meters, and the receiver aperture required for the western edge of the image area is 2368 meters (see FIG. 8).

Figure 9:
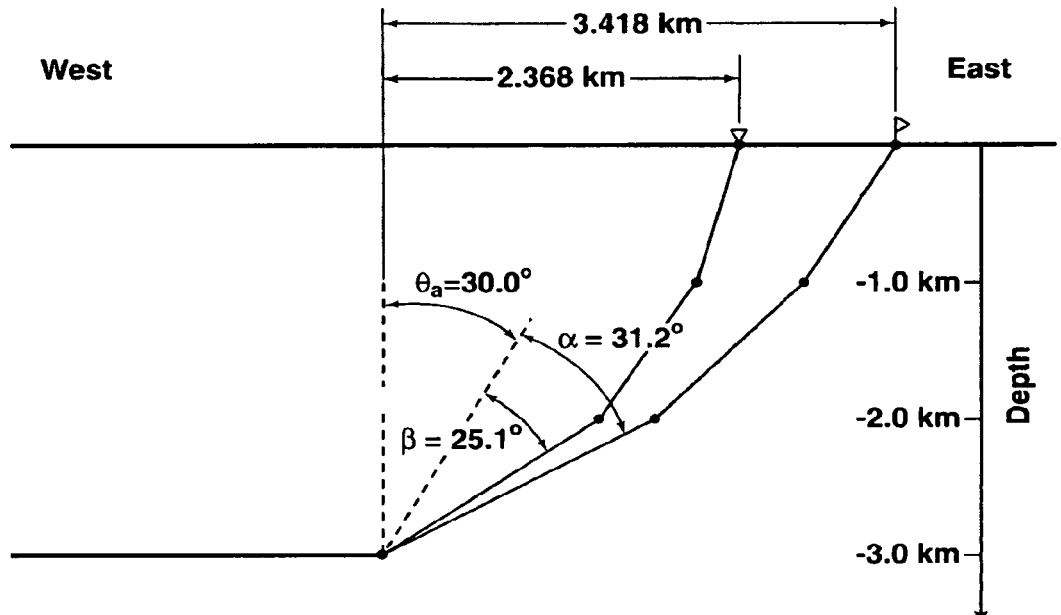

The aperture solution for the eastern edge of the image area is an exact mirror representation of the aperture solution of the western edge of the image area. Hence, the source aperture required for the eastern edge of the image area is 3418 meters, and the receiver aperture required for the eastern edge of the image area is 2368 meters (see FIG. 9).

Figure 10:
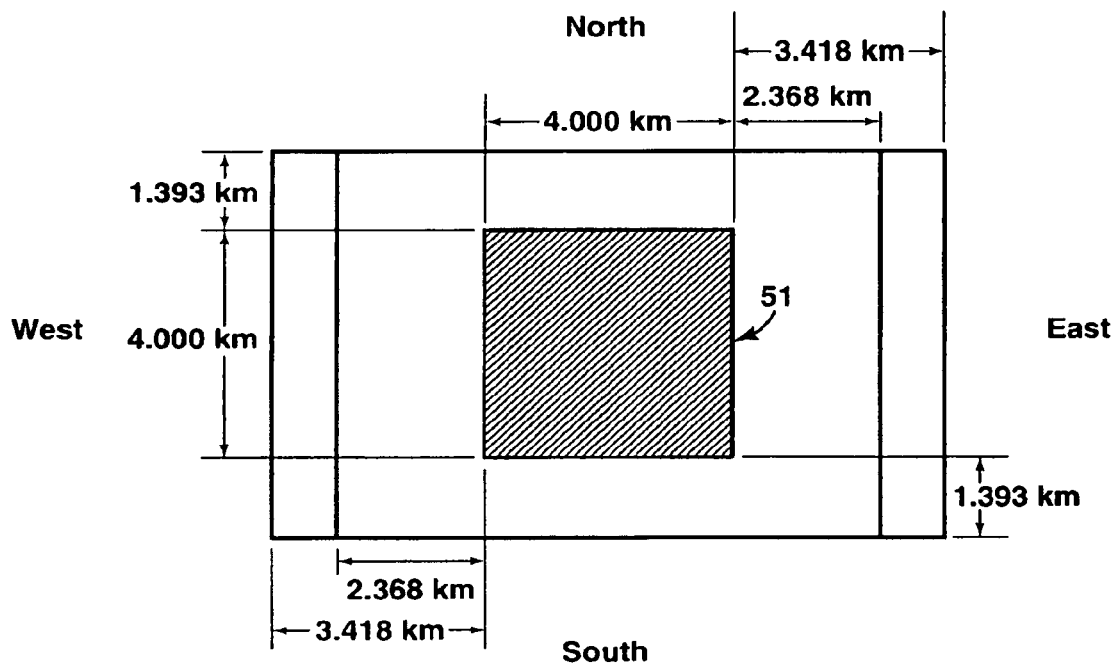

The aperture solutions for the northern and southern edges could also be solved by ray tracing. However, a good approximation of the aperture solution for these edges is given by an arithmetic average of both the source and receiver apertures for both the east-west and west-east azimuth solutions. Hence, an approximate solution for the source and receiver apertures for the northern and southern edges of the image area is given by (−632+2368+3418+418)/4=1393 meters. A summary of the source and receiver aperture requirements for all edges of the image area 51 is summarized in FIG. 10.

iii) Determine the Bin Size Required to Avoid Aliasing the Seismic Wave Returned from the Target Depth.

In the first step, the required bandwidth was determined to be 28.0 Hz. In this example, the largest frequency required to achieve the specified bandwidth of 28.0 Hz. is given by $$f_{max}=(f_{hp})_{hi}\cong 1.75BW\cong 49.0.$$

Then, the required bin size independent of scattering angle is given by the formula $$\Delta x \le \frac{V_p}{2(1+\gamma)f_{max}\sin\theta_a}.$$

Evaluating for a maximum frequency of 49.0 Hz. and a migration acceptance angle of 30° gives $$\Delta x \le \frac{2500}{2(1+(5/3))49.0\sin 30°} \cong 19.1.$$

Hence, a bin size no greater than 19.1 meters is needed to avoid aliasing 49.0 Hz. given a migration acceptance angle of 30° for any scattering angle. Those skilled in the art of seismic survey design can use the required bin size and determine corresponding maximum intervals between source stations and between receiver stations that are allowed when acquiring the seismic survey.

Example 3

This example is the same as Example 2, except it has been specified that only east-west orientations of source-receiver pairs will be acquired for imaging. The solutions to steps i) and iii) are the same as in Example 2 and are not repeated for Example 3. But the aperture solution in step ii) is different than Example 2 because both east-west and west-east orientations of source-receiver pairs were required for imaging in Example 2, but only east-west orientations of source-receiver pairs will be acquired for imaging in Example 3.

i) Determine the Bandwidth Required to Achieve the Specified Vertical Seismic Resolution at the Target Depth.

(Solution is given in step i) of Example 2)

ii) Determine the Migration Acceptance Angle and Corresponding Source and Receiver Apertures Required to Achieve the Specified Lateral Seismic Resolution at the Target Depth.

The minimum required migration acceptance angle is determined by $$\theta_a \approx \arcsin\frac{R_v}{R_{lm}}.$$

Evaluating, the required migration acceptance angle is given by $$\theta_a \approx \arcsin\frac{20}{40} = 30°.$$

Once the minimum required migration acceptance angle is determined, ray tracing may be used to determine the corresponding aperture. It has previously been decided that imaging of only east-west orientations of source-receiver pairs is to be pursued.

An aperture that will capture the required migration acceptance angle for each edge of the image area must now be determined. First, the aperture for the western edge of the image area is considered. Two rays are traced to the surface of the velocity model of the earth. One ray represents the incident seismic wave and one ray represents the reflected (or scattered) seismic wave. For the east-west orientation, the takeoff angle from the vertical for the incident ray is given by $\theta_\alpha - \alpha$, and the takeoff angle from the vertical for the reflected (or scattered) ray is given by $\theta_\alpha + \beta$. The migration acceptance angle is 30° from the vertical directed westward; i.e., away from the image area. Iteratively ray tracing the two rays for changing values of $\alpha$ and $\beta$ (recalling that $\alpha$ and $\beta$ are related to one another by Snell's law) until an offset of 3000 meters is obtained provides a solution for the source and receiver apertures. In this case, the ray trace solution obtains incident and reflection angles of 44.9° and 25.1°, respectively. Evaluating, the two takeoff angles are 30°−44.9°=−14.9° and 30°+25.1°=55.1° from the vertical directed westward. (Note that −14.9° directed westward is the same as 14.9° directed eastward.) The ray representing the incident seismic wave begins at a depth of 3000 meters and a takeoff angle of 14.9° eastward from the vertical, and is ray traced upward through the compressional wave velocity model of the earth to the surface, as illustrated in FIG. 6. The end point of the ray trace represents a source location, and the lateral distance between start point and the end point of the ray is the source aperture required for the western edge of the image area. In this case, the ray trace solution gives a source aperture of −632 meters. The ray representing the reflected (or scattered) seismic wave begins at a depth of 3000 meters and a takeoff angle of 55.1° westward from the vertical, and is ray traced upward through the shear wave velocity model of the earth to the surface, as illustrated in FIG. 6. The end point of the ray trace represents a receiver location, and the lateral distance between start point and the end point of the ray is the receiver aperture required for the western edge of the image area. In this case, the ray trace solution gives a receiver aperture of 2368 meters.

Figure 11:
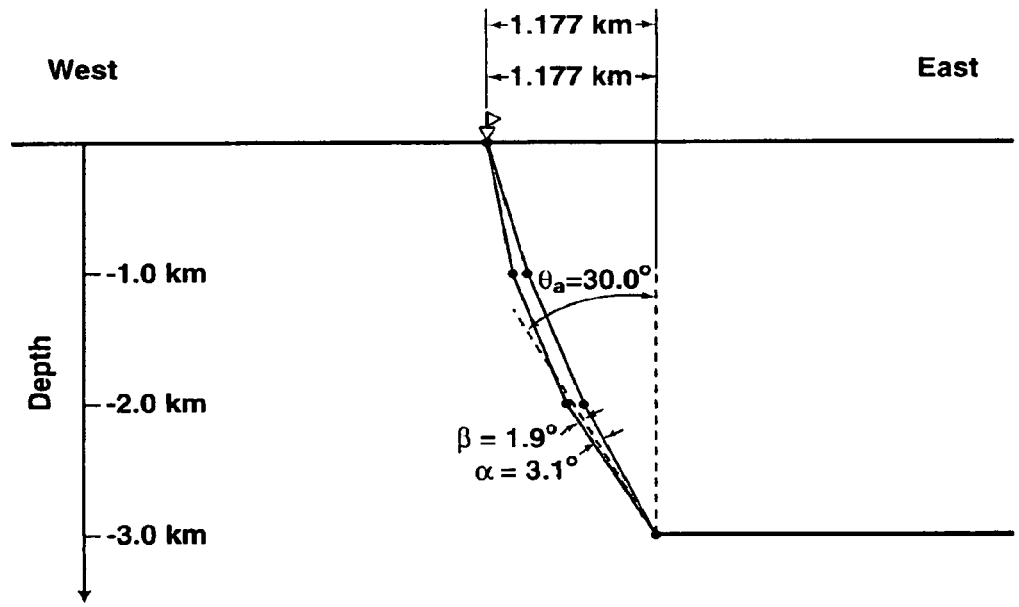
FIGS. 11-16 illustrate determination of migration acceptance angle and corresponding source and receiver apertures in Example 3.

The apertures solved above are valid for the 3000 meter offset, but the survey also includes smaller offsets, down to an offset of 0 meters, that are to be imaged. Aperture requirements for all offsets need to be satisfied. Ray tracing was used to solve for the scattering angle corresponding to an offset of 3000 meters, then solve for the corresponding aperture. Another end-member for aperture requirements is determined by ray tracing the case for an offset of 0 meters. (This end member did not need to be considered in the previous two examples because the maximum offset or scattering angle for both east-west and west-east orientations provided the end-members for aperture requirements in those cases). For the east-west orientation, the takeoff angle from the vertical for the incident ray is given by $\theta_\alpha - \alpha$, and the takeoff angle from the vertical for the reflected (or scattered) ray is given by $\theta_\alpha + \beta$. The migration acceptance angle is 30° from the vertical directed westward; i.e., away from the image area. Iteratively ray tracing the two rays for changing values of $\alpha$ and $\beta$ (recalling that $\alpha$ and $\beta$ are related to one another by Snell's law) until an offset of 0 meters is obtained provides a solution for the source and receiver apertures. In this case, the ray trace solution obtains incident and reflection angles of 3.1° and 1.9°, respectively. Evaluating, the two takeoff angles are 30°−3.1°=26.9° and 30°+1.9°=31.9° from the vertical directed westward. The ray representing the incident seismic wave begins at a depth of 3000 meters and a takeoff angle of 26.9° westward from the vertical, and is ray traced upward through the compressional wave velocity model of the earth to the surface, as illustrated in FIG. 11. The end point of the ray trace represents a source location, and the lateral distance between start point and the end point of the ray is the source aperture required for the western edge of the image area. In this case, the ray trace solution gives a source aperture of 1177 meters. The ray representing the reflected (or scattered) seismic wave begins at a depth of 3000 meters and a takeoff angle of 31.9° westward from the vertical, and is ray traced upward through the shear wave velocity model of the earth to the surface, as illustrated in FIG. 11. The end point of the ray trace represents a receiver location, and the lateral distance between start point and the end point of the ray is the receiver aperture required for the western edge of the image area. In this case, the ray trace solution gives a receiver aperture of 1177 meters. The fact that the source aperture equals the receiver aperture for this calculation is expected since the solution is for the zero offset and hence each source location is coincident with its corresponding receiver location.

Figure 12:
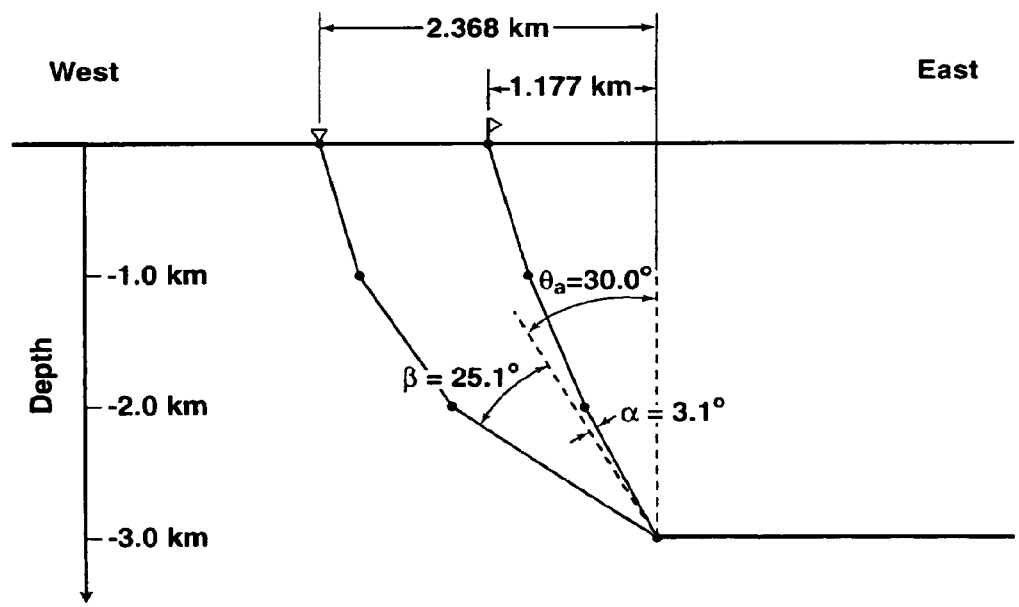

In order to meet the aperture requirements for all offsets, the largest source and receiver apertures from both the 3000 meter and 0 meter offsets are required. In this case, the source aperture required for the western edge of the image area is 1177 meters, and the receiver aperture required for the western edge of the image area is 2368 meters (see FIG. 12).

Figure 13:
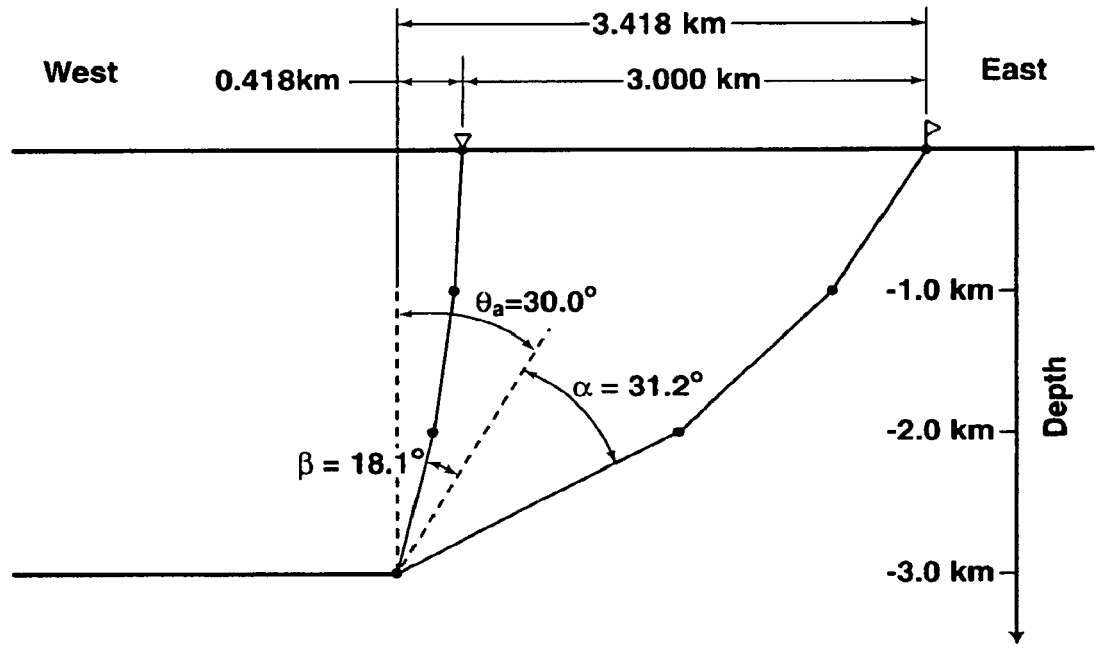

In the previous two examples, the aperture solution for the eastern edge of the image area was an exact mirror representation of the aperture solution of the western edge of the image area. In this case, that symmetry does not exist, because there is only one orientation being acquired. Now, the aperture for the eastern edge of the image area is considered. Two rays are traced to the surface of the velocity model of the earth. One ray represents the incident seismic wave and one ray represents the reflected (or scattered) seismic wave. For the east-west orientation, the takeoff angle from the vertical for the incident ray is given by $\theta_\alpha + \alpha$, and the takeoff angle from the vertical for the reflected (or scattered) ray is given by $\theta_\alpha - \beta$. The migration acceptance angle is 30° from the vertical directed eastward; i.e., away from the image area. Iteratively ray tracing the two rays for changing values of $\alpha$ and $\beta$ (recalling that $\alpha$ and $\beta$ are related to one another by Snell's law) until an offset of 3000 meters is obtained provides a solution for the source and receiver apertures. In this case, the ray trace solution obtains incident and reflection angles of 31.2° and 18.1°, respectively. Evaluating, the two takeoff angles are 30°+31.2°=61.2° and 30°−18.1°=11.9° from the vertical directed eastward. The ray representing the incident seismic wave begins at a depth of 3000 meters and a takeoff angle of 61.2° eastward from the vertical, and is ray traced upward through the compressional wave velocity model of the earth to the surface, as illustrated in FIG. 13. The end point of the ray trace represents a source location, and the lateral distance between start point and the end point of the ray is the source aperture required for the eastern edge of the image area. In this case, the ray trace solution gives a source aperture of 3418 meters. The ray representing the reflected (or scattered) seismic wave begins at a depth of 3000 meters and a takeoff angle of 11.9° eastward from the vertical, and is ray traced upward through the shear wave velocity model of the earth to the surface, as illustrated in FIG. 13. The end point of the ray trace represents a receiver location, and the lateral distance between start point and the end point of the ray is the receiver aperture required for the eastern edge of the image area. In this case, the ray trace solution gives a receiver aperture of 418 meters.

Figure 14:
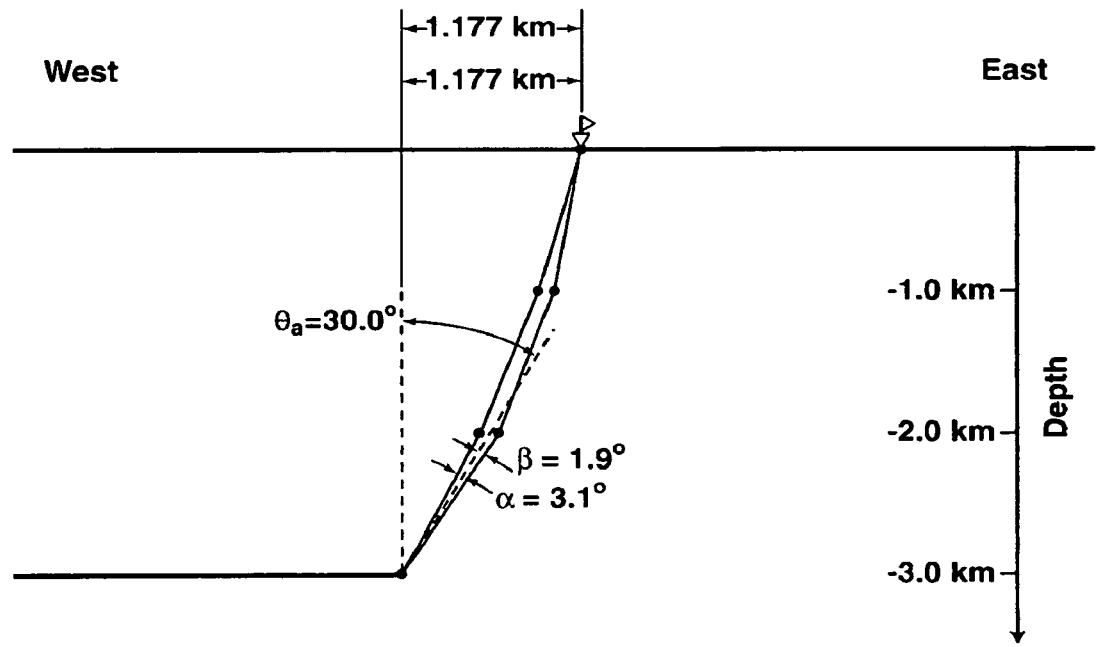

The apertures solved above are valid for the 3000 meter offset, but the survey also includes smaller offsets, down to an offset of 0 meters, that are to be imaged. Aperture requirements for all offsets need to be satisfied. Ray tracing was used to solve for the scattering angle corresponding to an offset of 3000 meters, then solve for the corresponding aperture. Another end-member for aperture requirements is determined by ray tracing the case for an offset of 0 meters. Unlike finite valued offsets, the 0 meter offset has no orientation associated with it, so the aperture solution for the eastern edge of the image area is an exact mirror representation of the aperture solution of the western edge of the image area. Hence, the source aperture required for the eastern edge of the image area is 1177 meters, and the receiver aperture required for the eastern edge of the image area is 1177 meters (see FIG. 14).

Figure 15:
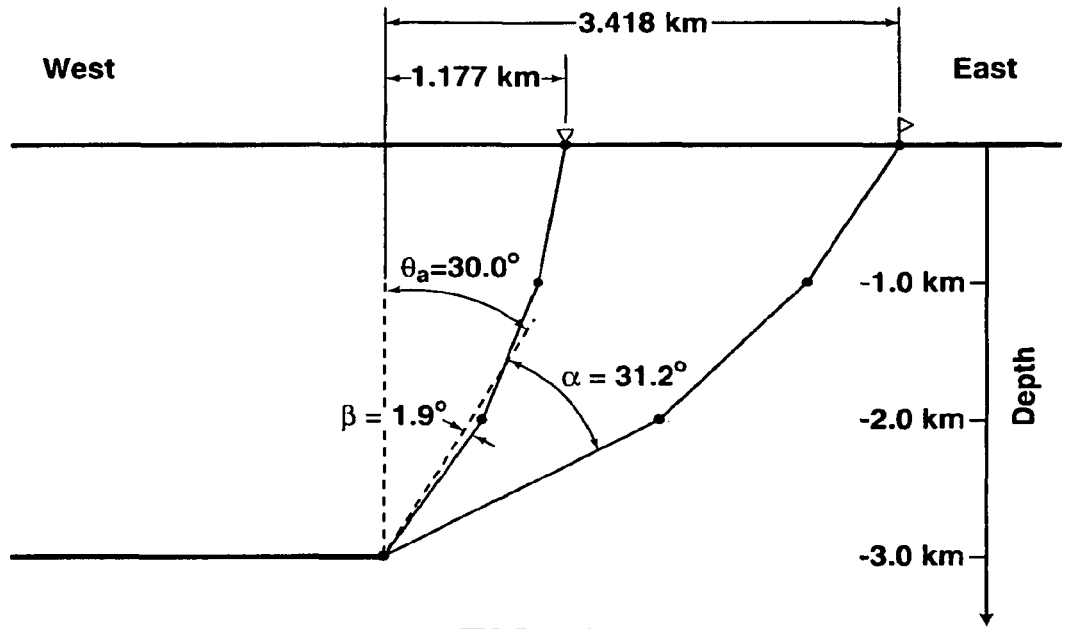

In order to meet the aperture requirements for all offsets, the largest source and receiver apertures from both the 3000 meter and 0 meter offsets are required. In this case, the source aperture required for the eastern edge of the image area is 3418 meters, and the receiver aperture required for the eastern edge of the image area is 1177 meters (see FIG. 15).

Figure 16:
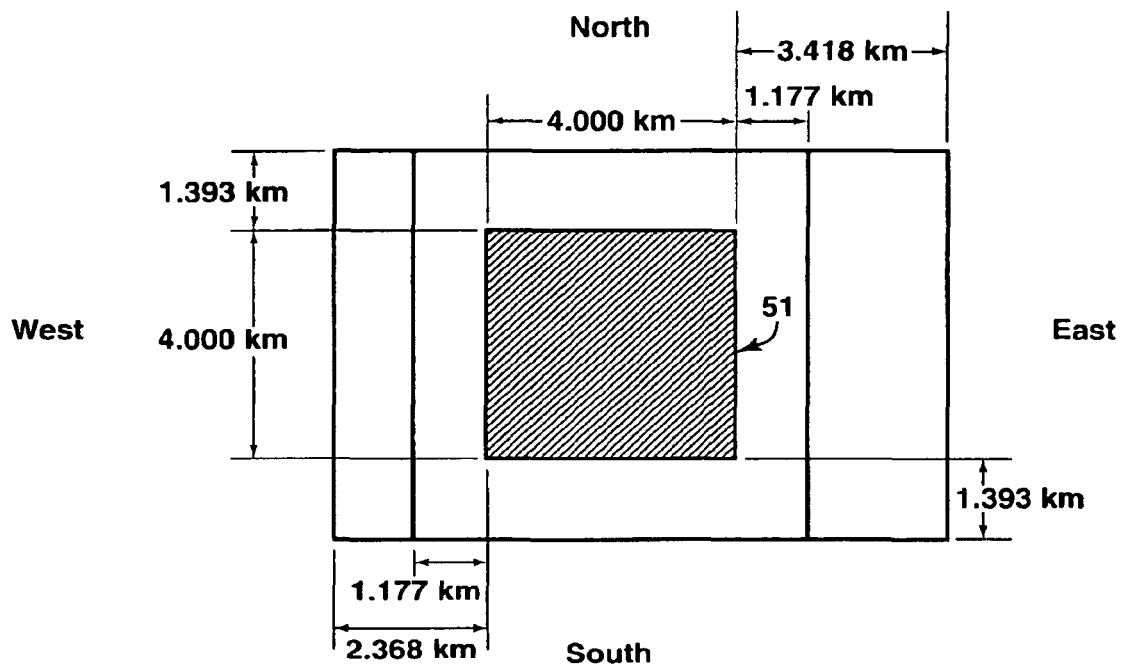

The aperture solutions for the northern and southern edges could also be solved by ray tracing. However, a good approximation of the aperture solution for these edges is given by the same method used in the previous example that resulted in the value of 1393 meters. A summary of the source and receiver aperture requirements for all edges of the image area 51 is summarized in FIG. 16.

iii) Determine the Bin Size Required to Avoid Aliasing the Seismic Wave Returned from the Target Depth.

(Solution is given in step iii) of Example 2)

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

APPENDIX

The problem of seismic resolution is approached by first considering trace resolution, then image resolution. Trace resolution describes the minimum time duration between two events on a single trace in which the two events remain distinctive and measurable; i.e., the amplitude of both events and the time interval between events are accurately represented. Note that this concept should not be confused with thin bed modeling which relies on a thin bed assumption and "constructive" or "destructive" interference to estimate thin bed thickness. Because the events are strongly interfering with one another they are, by definition, not resolved. Under this scenario, amplitudes may depend on either changes in thickness or changes in impedance contrast. In the case of a resolved measurement, such ambiguity does not exist. Language such as "quarter-wavelength" or "tuning thickness" is typically indicative of a thin bed modeling discussion. The present discussion will employ information theory concepts such as "effective duration" and "effective frequency width". These concepts have substantial history and are used to relate time frequency bandwidth and local velocities to resolution.

Whereas trace resolution addresses a single trace derived from a single source-receiver pair, image resolution results from many traces being combined to form an image. Through use of imaging theory, image resolution can be related to time frequency bandwidth, migration acceptance angle, and local velocities. Ray tracing through the overburden solves the corresponding aperture for a given migration acceptance angle. The process of imaging also requires avoidance of aliasing. Otherwise, the full frequency bandwidth may not contribute up to the migration acceptance angle resulting in a loss of information to the image and corresponding degradation of image resolution. On the assumption of a laterally homogeneous overburden, the sampling requirement to avoid aliasing is derived in terms of the maximum time frequency of interest, the migration acceptance angle, and local velocities.

The primary challenge in understanding the difference between the PP and PS descriptions for resolution is properly accounting for the mode change at the target, including the effect of differences in the propagation velocities of the incident and scattered wave and distribution of energy with scattering angle. The mode change eliminates a highly intuitive symmetry learned from the PP case. Additionally, the back scatter condition, or, correspondingly, the zero offset condition for the PP mode represents a substantial power proportion, but is generally unimportant to the PS mode. The PS mode returns no energy in the back scatter case, neither does the back scatter case generally correspond to zero offset. Therefore, the PS resolution problem must address large scattering angles and finite offsets.

Derivation of Vertical Resolution

The derivation of the vertical resolution relation is described in this section. To be more precise, it is the relation for "trace resolution" that is derived. The trace resolution exactly equates to "vertical resolution" on an unmigrated seismic section (assuming the seismic section is plotted in the conventional manner with traces along the vertical direction) and approximately equates to "vertical resolution" on a migrated, or imaged, seismic section. The concept of pulse or wavelet width is central to the discussion of trace resolution. Two events on a seismic trace arriving within a time interval less than a wavelet width are not resolved. The most generally useful definitions of widths deal with variance in energy distribution. See for example, D. Gabor, "Theory of communication," *J. IEE,* 93, 429-441 (1946) and E. Clark Trantham "Minimum uncertainty pulses for filters," *Geophysics,* 58, 853-862 (1993). Gabor defines the square of the "effective duration" as $2\pi$ times the variance of the square of the wavelet. Similarly, the square of the "effective frequency width" is defined as $2\pi$ times the variance of the squared amplitude of the Fourier transform of the wavelet. Given these definitions, Gabor was able to show the product of effective duration and effective frequency width has a minimum achievable value, $$\Delta t \Delta f \geq 1/2, \tag{A1}$$

also known as the uncertainty principle. The wavelet of a real seismic experiment can have no amplitude at zero hertz and is preferably zero phase. Under these constraints, Trantham shows that the Ricker wavelet is the minimum uncertainty solution. The uncertainty product for the Ricker wavelet is $$\Delta t_R \Delta f_R = \sqrt{35/12} \approx 1.71. \tag{A2}$$

Because survey design regards the best achievable resolution, much of the remaining discussion assumes a Ricker wavelet, with the understanding that any other experimentally obtainable zero phase wavelet has a greater uncertainty product and is not capable of equal or better resolution.

Frequency domain observations are routinely reported in terms of measures of the power spectrum, defined only for positive frequencies, rather than the amplitude of the Fourier transform, which is defined for both positive and negative frequencies. Often, the measure of "bandwidth" is referenced, defined as the difference between frequencies at which the power drops to half of the peak power (−3 dB). For the Ricker spectrum, the relation between bandwidth and effective duration is $BW_R \cong 0.294 \Delta f_R$. Substituting into the uncertainty product gives $$\Delta t_R BW_R \cong 0.502. \tag{A3}$$

Figure 19:
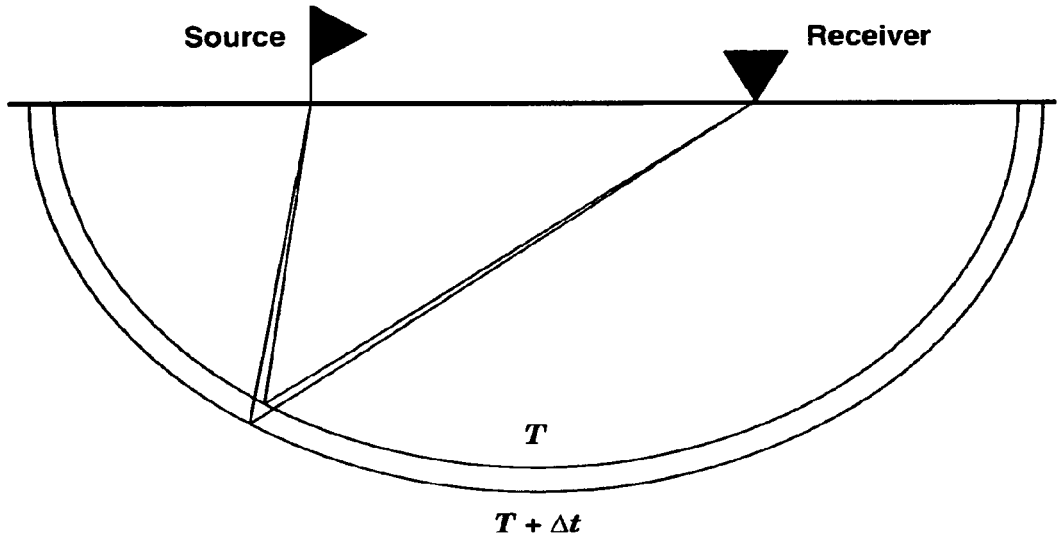
FIG. 19 shows constant two-way travel time contours for a source-receiver pair.

Vertical resolution derives from time uncertainty represented by wavelet width or duration mapped into spatial uncertainty. The mapping is controlled by the direction of wave propagation and propagation velocities. Consider a half-space with a known velocity field, $V(\vec{x})$, and the travel time from a source location on the boundary of the half-space, $\vec{x}_s$, to a point (as in the location of a point diffractor) in the half space, $\vec{x}$, to a receiver location on the boundary of the half-space, $\vec{x}_r$, represented by $T(\vec{x}_s, \vec{x}, \vec{x}_r)$. An event arriving at some time on the seismic trace recorded for a given source-receiver pair may come from any point on the travel time contour corresponding to the time of arrival, indicated schematically as the contour T in FIG. 19. On the same trace, an arrival a small time increment away from the first arrival comes from any point on a nearby travel time contour, T+Δt. Given a single trace, no distinction can be made from events along the travel time contours; i.e., there is no spatial resolution along the contour. The multi-trace process of imaging is required to properly position events along the contour. (The spatial resolution of imaged seismic data will be discussed in the following section on lateral resolution.) Thus, a given time increment, Δt, may correspond to any number of possible spatial increments, $\Delta \vec{x}$, connecting any two points on each of the two time contours. However, for vertical resolution, it is the shortest spatial increment between travel time contours for a given Δt that is of interest.

Consider a point $\vec{x}$ and the travel time function $T(\vec{x}_s, \vec{x}, \vec{x}_r)$. For an infinitesimal increase in time, δt, the distance between the point $\vec{x}$ and a point on the new travel time contour T+δt may take many values since there is no particular restriction of what point on T+δt to compare. However, provided we choose a point on the contour T+δt such that $\delta \vec{x} \to 0$ as $\delta t \to 0$, we may consider the derivative $d\vec{x}/dt$. The component of the derivative in the direction normal to the travel time contour T has particular meaning as it represents the smallest value of δ$\vec{x}$ for a given δt. Hence, this component represents the smallest spatial distance between travel time contours T and T+δt. Additionally, the spatial gradient of the travel time function, $\nabla T(\vec{x}_s, \vec{x}, \vec{x}_r)$, describes the largest rate of change of travel time with displacement in $\vec{x}$. The vector $\nabla T(\vec{x}_s, \vec{x}, \vec{x}_r)$ is in the direction normal to the travel time contour and has magnitude the inverse of magnitude of $d\vec{x}/dt$ along the same direction:

$$\frac{d\vec{x}}{dt} \cdot \nabla T(\vec{x}_s, \vec{x}, \vec{x}_r) = 1. \tag{A4}$$

Finite increments may be considered by integrating Eq. A4 over the time interval of interest:

$$\int_T^{T+\Delta t} \nabla T(\vec{x}_s, \vec{x}, \vec{x}_r) \cdot \frac{d\vec{x}}{dt} dt = \int_T^{T+\Delta t} dt, \tag{A5}$$

$$\int_{\vec{x}(T)}^{\vec{x}(T+\Delta t)} \nabla T(\vec{x}_s, \vec{x}, \vec{x}_r) \cdot d\vec{x} = \Delta t. \tag{A6}$$

However, the left hand side of Eq. (A6) remains a function of $\vec{x}$, that is, the integral limits may go from any location on the travel time contour T to any location on the travel time contour T+Δt. Furthermore, the path between locations can be any path in the half-space. (The requirement is that the vector field $\nabla T(\vec{x}_s, \vec{x}, \vec{x}_r)$ is conservative and everywhere defined on the path.) The path of interest for vertical resolution is the path between contours that is everywhere normal to travel time contours or, equivalently, everywhere parallel to $\nabla T(\vec{x}_s, \vec{x}, \vec{x}_r)$. This path is the shortest between travel time contours provided the direction of $\nabla T(\vec{x}_s, \vec{x}, \vec{x}_r)$ does not change along the path. The unit tangent vector to the path is given by d $\vec{l}/dl = \nabla T(\vec{x}_s, \vec{x}, \vec{x}_r)/|\nabla T(\vec{x}_s, \vec{x}, \vec{x}_r)|$. For a given location on the travel time contour T, there is a normal path to the travel time contour T+Δt that meets this requirement. The endpoints of this path are denoted $\vec{x}_o(T)$ and $\vec{x}_o(T+\Delta t)$, and the length of this path is the vertical resolution, $$\int_{\vec{x}_o(T)}^{\vec{x}_o(T+\Delta t)} \nabla T(\vec{x}_s, \vec{x}, \vec{x}_r) \cdot d\vec{l} = \Delta t, \tag{A7}$$

$$\int_{\vec{x}_o(T)}^{\vec{x}_o(T+\Delta t)} |\nabla T(\vec{x}_s, \vec{x}, \vec{x}_r)| dl = \Delta t. \tag{A8}$$

If $\nabla T(\vec{x}_s, \vec{x}, \vec{x}_r)$ is constant over the path of integration, then it may be removed from the integrand leaving the path length, or vertical resolution:

$$|\nabla T(\vec{x}_s, \vec{x}_o, \vec{x}_r)| R_v(\vec{x}_s, \vec{x}_o, \vec{x}_r) = \Delta t, \tag{A9}$$

where $R_v(\vec{x}_s, \vec{x}_o, \vec{x}_r)$ is the vertical resolution at location $\vec{x}_o$ for the trace recorded with a source at $\vec{x}_s$ and a receiver at $\vec{x}_r$. Therefore, vertical resolution evaluated at the point $\vec{x}$ may be written $$R_v(\vec{x}_s, \vec{x}, \vec{x}_r) = \frac{\Delta t}{|\nabla T(\vec{x}_s, \vec{x}, \vec{x}_r)|}. \tag{A10}$$

The spatial gradient of the travel time is readily evaluated by considering the travel time as the sum of the travel time from the source location to a point in the half space, $T(\vec{x}_s, \vec{x})$, and the travel time from the point in the half space to the receiver location, $T(\vec{x}, \vec{x}_r)$:

$$T(\vec{x}_s, \vec{x}, \vec{x}_r) = T(\vec{x}_s, \vec{x}) + T(\vec{x}, \vec{x}_r) \tag{A11}$$

Then, the spatial gradient of travel time is the sum of the spatial gradients of the two point travel times, $$\nabla T(\vec{x}_s, \vec{x}, \vec{x}_r) = \nabla T(\vec{x}_s, \vec{x}) + \nabla T(\vec{x}, \vec{x}_r) \tag{A12}$$

The two point travel times on the right hand side are intuitive and simple to describe. For example, the two point travel time, $T(\vec{x}_s, \vec{x})$, represents a wave propagating from the source location into the half space. A travel time contour in this case represents a wavefront, and the spatial gradient of the travel time is normal to the wavefront, parallel to the direction of propagation or vector wavenumber, and parallel to ray paths. The travel time along a ray path from the source location, $\vec{x}_s$, to a point in the half space, $\vec{x}$, is given by $$T(\vec{x}_s, \vec{x}) = \int_{\vec{x}_s}^{\vec{x}} \frac{dl}{V(l)}, \quad (A13)$$

where $l$ is the length of the ray path from $\vec{x}_s$ to $\vec{x}$. The spatial gradient of the travel time, $T(\vec{x}_s, \vec{x})$, is given by $$\nabla T(\vec{x}_s, \vec{x}) = \nabla \int_{\vec{x}_s}^{\vec{x}} \frac{dl}{V(l)} = \frac{\hat{k}_s(\vec{x}_s, \vec{x})}{V(\vec{x})}, \quad (A14)$$

where $\hat{k}_s(\vec{x}_s, \vec{x})$ is the unit vector parallel to the vector wavenumber at $\vec{x}$ of the wave propagating from $\vec{x}_s$ to $\vec{x}$.

The second term on the right hand side of Eqs. A11 and A12 must be considered with some care. Due to reciprocity, the travel time between two points is the same no matter the direction of travel; e.g., $T(\vec{x}, \vec{x}_r) = T(\vec{x}_r, \vec{x})$. However, attention must be paid to polarity when considering the spatial gradient of the travel time. Generally, the spatial gradient is in the direction of increasing path length and is positive when travel time increases with increasing path length. In the case of the ray path connecting $\vec{x}_r$ and $\vec{x}$, though the wave propagation direction is from $\vec{x}$ to $\vec{x}_r$, the spatial gradient of the travel time between $\vec{x}_r$ and $\vec{x}$ is in the opposite direction. That is, given the fixed end of the ray path at $\vec{x}_r$ and the variable end of the ray path at $\vec{x}$, the increasing path length with increasing time is in the direction "away" from $\vec{x}_r$. Hence, in this case, $$\nabla T(\vec{x}, \vec{x}_r) = \frac{-\hat{k}_r(\vec{x}, \vec{x}_r)}{V(\vec{x})}, \quad (A15)$$

where $\hat{k}_r(\vec{x}, \vec{x}_r)$ is the unit vector parallel to the vector wavenumber at $\vec{x}$ of the wave propagating from $\vec{x}$ to $\vec{x}_r$.

Combining Eqs. A12, A14 and A15, the following expression is derived for the spatial gradient of time travel from the source location to a point in the half space to the receiver location, $$\nabla T(\vec{x}_s, \vec{x}, \vec{x}_r) = \frac{\hat{k}_s(\vec{x}_s, \vec{x})}{V_\alpha(\vec{x})} - \frac{\hat{k}_r(\vec{x}, \vec{x}_r)}{V_\beta(\vec{x})}, \quad (A16)$$

where the subscripts $\alpha$ and $\beta$ are included to consider the possibility of two different velocities of wave propagation at the same location; $V_\alpha(\vec{x})$ the velocity of wave propagation for the wave from $\vec{x}_s$ to $\vec{x}$, and $V_\beta(\vec{x})$ the velocity of wave propagation for the wave from $\vec{x}$ to $\vec{x}_r$. The distinction is important when considering mode converted waves. Combining Eqs. A8 and A16 gives the expression for wavelet width $$\Delta t = \int_{\vec{x}_o(T)}^{\vec{x}_o(T+\Delta t)} \left| \frac{\hat{k}_s(\vec{x}_s, \vec{x})}{V_\alpha(\vec{x})} - \frac{\hat{k}_r(\vec{x}, \vec{x}_r)}{V_\beta(\vec{x})} \right| dl. \quad (A17)$$

If the velocities are constant in the vicinity of $\vec{x}_o$, wavelet width is given by $$\Delta t = \left| \frac{\hat{k}_s(\vec{x}_s, \vec{x}_o)}{V_\alpha(\vec{x}_o)} - \frac{\hat{k}_r(\vec{x}_o, \vec{x}_r)}{V_\beta(\vec{x}_o)} \right| R_v(\vec{x}_s, \vec{x}_o, \vec{x}_r). \quad (A18)$$

Then, vertical resolution evaluated at the point $\vec{x}$ may be written $$R_v(\vec{x}_s, \vec{x}, \vec{x}_r) = \frac{\Delta t}{\left| \frac{\hat{k}_s(\vec{x}_s, \vec{x})}{V_\alpha(\vec{x})} - \frac{\hat{k}_r(\vec{x}, \vec{x}_r)}{V_\beta(\vec{x})} \right|}. \quad (A19)$$

If the velocities are not constant in the vicinity of $\vec{x}$, but nearly constant, then Eq. A19 is valid as an approximation provided the ray path radius of curvature is much larger than the ray path length from T to T+$\Delta t$. This condition is usually well satisfied.

Application of Eq. A19 is very straightforward in many circumstances. Consider the zero offset, flat (horizontal) target reflector in a flat layered velocity medium. In this case, the incident and reflected wave on the target reflector are normal to the reflector and oppositely directed. Thus, $\hat{k}_s(\vec{x}) = -\hat{k}_r(\vec{x})$. (Note the assumption of zero offset and lateral homogeneity eliminates dependence on $\vec{x}_s$ and $\vec{x}_r$.) Then for the compressional wave (PP) case, the propagating velocity of both the incident and reflected waves is the compressional wave velocity, $V_\alpha(\vec{x}) = V_\beta(\vec{x}) = V_p(\vec{x})$. Substituting these values into Eq. A18 gives $\Delta t = \lfloor 2/V_p(\vec{x}) \rfloor R_v(\vec{x})$. For the converted wave (PS) case, the propagating velocity of the incident wave is the compressional wave velocity, $V_\alpha(\vec{x}) = V_p(\vec{x})$, and the propagating velocity of the reflected wave is the shear wave velocity, $V_\beta(\vec{x}) = V_s(\vec{x})$. Substituting these values into Eq. A18 gives $\Delta t = \lfloor [V_p(\vec{x}) + V_s(\vec{x})]/V_p(\vec{x})V_s(\vec{x}) \rfloor R_v(\vec{x})$. Note that this result generally holds as long as the incident and reflected wavenumber vectors are antiparallel, $\hat{k}_s = (\vec{x}_s, \vec{x}) = -\hat{k}_r(\vec{x}, \vec{x}_r)$. For the compressional wave case, this condition is satisfied for zero offset whether the target reflector is flat or dipping. This also illustrates the meaning of vertical resolution as the spatial resolution in the direction normal to a reflector, dipping or otherwise. For the zero offset converted wave case, the incident and reflected wavenumber vectors are antiparallel for a flat (horizontal) plane reflector but are not antiparallel, generally, for a dipping plane reflector. The compressional wave ray path to a point in the half space is generally different than the shear wave ray path even when source and receiver are colocated. However, there is likely some finite offset for which the incident and reflected wavenumber vectors are antiparallel.

Figure 20:
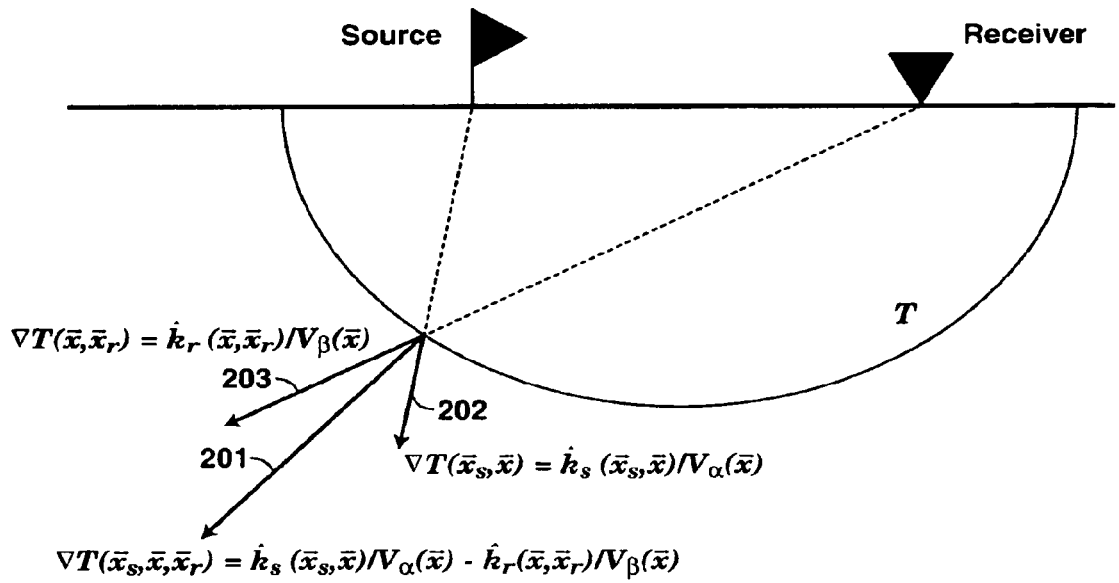
FIGS. 20 and 21 are diagrams showing how the spatial gradient of the travel time may be constructed as a vector sum for the general case where incident and reflected wavenumbers are not antiparallel.
Figure 21:
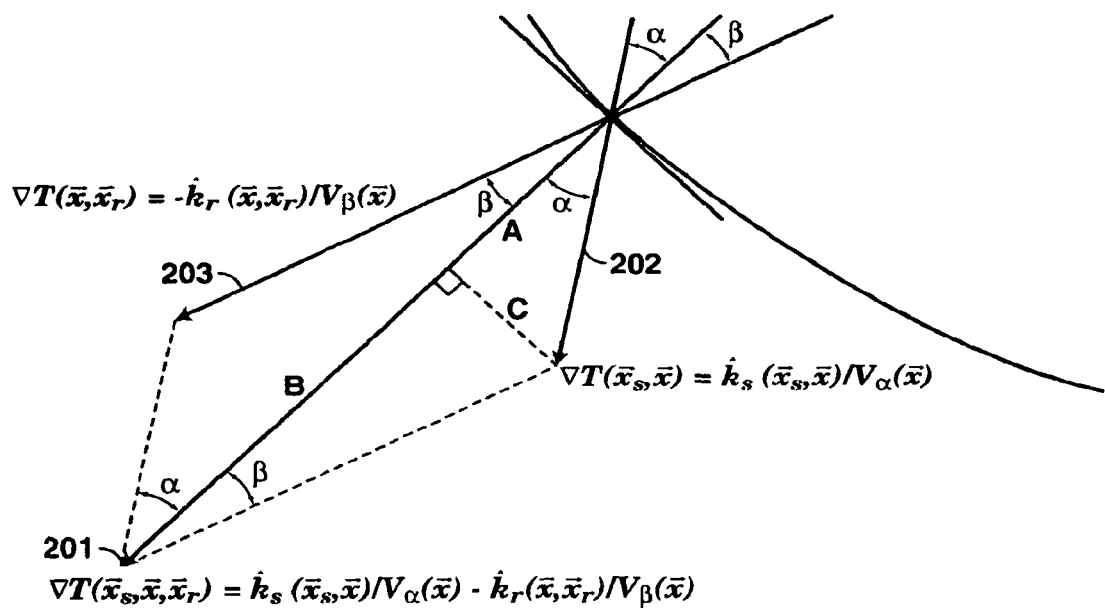

The result given in Eq. A19 is a generalized expression for vertical resolution that still holds even when the incident and reflected wavenumber vectors are not antiparallel. This is the case for finite offsets with the compressional wave, and more generally the case for the converted wave. FIG. 20 is a schematic diagram that illustrates the magnitude and direction of the spatial gradient of the travel time when incident and reflected wavenumber vectors are not antiparallel. Recalling that $\nabla T(\vec{x}_s, \vec{x}, \vec{x}_r)$ is the vector sum of $\nabla T(\vec{x}_s, \vec{x}) = \hat{k}_s(\vec{x}_s, \vec{x})/V_\alpha(\vec{x})$ and $\nabla T(\vec{x}, \vec{x}_r) = -\hat{k}_r(\vec{x}, \vec{x}_r)/V_\beta(\vec{x})$, the magnitude may be derived from simple geometry. The three vectors are shown in FIG. 20 as 201, 202 and 203, respectively. The angles $\alpha$ and $\beta$ are defined as the angle between the vectors $\nabla T(\vec{x}_s, \vec{x}, \vec{x}_r)$ and $\nabla T(\vec{x}_s, \vec{x})$, and the vectors $\nabla T(\vec{x}_s, \vec{x}, \vec{x}_r)$ and $\nabla T(\vec{x}, \vec{x}_r)$, respectively. From FIG. 21, it is apparent that $\cos \alpha = A/(1/V_\alpha(\vec{x}))$ and $\cos \beta = B/(1/V_\beta(\vec{x}))$. Therefore, $$|\nabla T(\vec{x}_s, \vec{x}, \vec{x}_r)| = A + B = \frac{\cos\alpha}{V_\alpha(\vec{x})} + \frac{\cos\beta}{V_\beta(\vec{x})}. \quad (A20)$$

Given the directions of $\nabla T(\vec{x}_s, \vec{x})$ and $\nabla T(\vec{x}, \vec{x}_r)$ may be determined from ray tracing, the direction of $\nabla T(\vec{x}_s, \vec{x}, \vec{x}_r)$ may be determined from either of the angles $\alpha$ or $\beta$. From FIG. 21, it is shown that $\sin \alpha = C/(1/V_\alpha(\vec{x}))$ and $\sin \beta = C/(1/V_\beta(\vec{x}))$. These two equations may be combined to obtain $$\frac{\sin\alpha}{V_\alpha(\vec{x})} = \frac{\sin\beta}{V_\beta(\vec{x})}, \quad (A21)$$

which is Snell's Law. Hence, the ray paths from source to point, and from point to receiver, also satisfy reflection at the point from a dipping plane normal to $\nabla T(\vec{x}_s, \vec{x}, \vec{x}_r)$. This illustrates, again, the meaning of vertical resolution as the spatial resolution in the direction normal to a reflector; in this case, for non-normal incidence.

Combining the above results with the uncertainty principle produces an expression for vertical resolution as a function of effective frequency width, $\Delta f$, written for a given source-receiver pair:

$$R_v(\vec{x}) \geq \frac{V_\alpha(\vec{x})V_\beta(\vec{x})}{2\Delta f[V_\beta(\vec{x})\cos\alpha + V_\alpha(\vec{x})\cos\beta]}. \quad (A22)$$

Note the special case where $\alpha=\beta=0$ describes normal incidence. Furthermore, restricting the best possible case to the effective frequency width of a Ricker wavelet, yields $$R_v(\vec{x}) \geq \frac{V_\alpha(\vec{x})V_\beta(\vec{x})}{\Delta f[V_\beta(\vec{x})\cos\alpha + V_\alpha(\vec{x})\cos\beta]} \sqrt{\frac{35}{12}}. \quad (A23)$$

The relation may also be expressed in terms of the bandwidth for a Ricker wavelet. Representing Eq. A3 by the approximation $\Delta t_R BW_R \cong 1/2$, and substituting gives $$R_v(\vec{x}) \geq \frac{V_\alpha(\vec{x})V_\beta(\vec{x})}{2BW[V_\beta(\vec{x})\cos\alpha + V_\alpha(\vec{x})\cos\beta]}. \quad (A24)$$

Note that the expression contains a cosine functional dependence on angles. For small angle variation around the angle of zero degrees, there is very little variation in the value of the cosine function. This is why normal incidence is a good approximation for near normal incidence converted waves as long as there is sufficient energy reflected. However, in cases where design needs to focus on angles of maximum energy return, Zoeppritz equations can be used to determine the angles of incidence and reflection that return suitable energy.

Then Eq. A24 can be used to solve for the vertical resolution, recalling the direction of resolution is normal, or vertical, to the plane reflector.

Derivation of Lateral Resolution

Generally, it is convenient to think of lateral resolution as the resolution across traces. This distinguishes lateral resolution from vertical resolution often described as resolution along a trace, as discussed in previous sections. However, while the previous discussion on vertical resolution refers specifically to resolution on a single trace prior to migration or other processes that move energy between traces, lateral resolution is used, almost exclusively, to describe resolution across traces on imaged seismic data. Hence, the effect of imaging must be considered for a proper description of lateral resolution.

The objective of imaging is to place proper spatial relationship to energy recorded on numerous time traces. Perhaps the three most important factors impacting spatial uncertainty of imaged seismic data are: i) imaging error derived from approximate velocities and imperfect imaging algorithms, ii) finite aperture, and iii) time uncertainty derived from band-limited wavelets and noise. The following description analyzes the last two factors; i.e., the effect of finite aperture and time uncertainty due to wavelet width on spatial resolution of imaged seismic data. The first factor, imaging error, is not treated. As such, perfect imaging is assumed, or at least imaging sufficiently accurate that spatial uncertainty derived from imaging error is comparatively small.

The "point spread function" is a term encountered in the area of diffraction tomography. See for example, A. J. Devaney, "Geophysical diffraction tomography," *IEEE Transactions on Geoscience and Remote Sensing*, GE-22, 3-13, (1984) and Thomas A. Dickens and Graham A. Winbow, "Spatial resolution of diffraction tomography," *Journal of the Acoustical Society of America*, 101, 77-86, (1997). It describes the region of image spatial frequencies sampled by given arrangements of sources and receivers. This discussion employs a similar concept called the "spatial wavelet" to describe seismic image resolution, and is defined as a three dimensional amplitude distribution around an image point. It is derived from time uncertainty on individual traces and the practical restriction of finite numbers of traces used in imaging. It's width dimensions establish a meaningful reference for resolution in the same way effective duration does for vertical resolution. The spatial wavelet is determined from the image spatial frequency distribution derived from all traces contributing to an image point. The image spatial frequency contributing to an image point from a single trace can be evaluated using the relationships derived in the previous section. Following evaluation of each contributing trace, the total image spatial frequency distribution at an image point is obtained by including the image spatial frequency distributions from each trace. Then the spatial wavelet and the image spatial frequency distribution are related through the three dimensional Fourier transform.

The image spatial frequency is defined from an alternate form of Eq. A4:

$$\vec{p}(\vec{x}_s, \vec{x}, \vec{x}_r) = f \nabla T(\vec{x}_s, \vec{x}, \vec{x}_r), \quad (B1)$$

where $\vec{p}(\vec{x}_s, \vec{x}, \vec{x}_r)$ is the image spatial frequency given in cycles per unit length contributing to the image point $\vec{x}$ from a trace recorded by the receiver at $\vec{x}_r$ and the source at $\vec{x}_s$. See for example, G. Beylkin, M. Oristaglio, and D. Miller, "Spatial resolution of migration algorithms," in Proceedings of the 14th International Symposium on Acoustical Imaging, ed. A. J. Berkhout, J. Ridder, and L. F. van der Wal, 155-167 (1985).

Furthermore, the dispersion relation, $V(\vec{x})=f/k(\vec{x})$, may be substituted into Eqs. A14 and A15 to give $fVT(\vec{x}_s,\vec{x})=\vec{k}_s(\vec{x}_s,\vec{x})$ and $fVT(\vec{x},\vec{x}_r)=\vec{k}_r(\vec{x},\vec{x}_r)$ where $\vec{k}_s(\vec{x}_s,\vec{x})$ is the vector wavenumber at $\vec{x}$, given in cycles per unit length, of the wave propagating from the source location, $\vec{x}_s$, to the image point, $\vec{x}$, and $\vec{k}_r(\vec{x},\vec{x}_r)$ is the vector wavenumber at $\vec{x}$ of the wave propagating from the image point, $\vec{x}$, to the receiver location, $\vec{x}_r$. Combining these results with Eq. A12 gives the image spatial frequency contribution to an image point:

$$\vec{p}(\vec{x}_s,\vec{x},\vec{x}_r) = \vec{k}_s(\vec{x}_s,\vec{x}) - \vec{k}_r(\vec{x},\vec{x}_r). \tag{B2}$$

Then, if all traces have the same wavelet with a time frequency distribution given by A(f), the corresponding image spatial frequency distribution is given by $$W(\vec{p}(\vec{x}_s,\vec{x},\vec{x}_r)) = W\left(f\left[\frac{\hat{k}_s(\vec{x}_s,\vec{x})}{V_\alpha(\vec{x})} - \frac{\hat{k}_r(\vec{x},\vec{x}_r)}{V_\beta(\vec{x})}\right]\right) = A(f). \tag{B3}$$

The assumption of identical wavelets on all traces may be appropriate for noise free conditions where wavelet altering effects, such as attenuation, can be reversed to restore a common wavelet. However, the presence of noise may restrict the accuracy of inverse processes. For example, a practical result of the effect of attenuation when noise is present may be an alteration of useful time frequencies and effective wavelet shape as a function of travel time. The result could be modelled as a travel time dependent time frequency distribution A(f, T), in which case an expression for the spatial frequency distribution is more complex than that given by Eq. B3 (but still tractable). Additionally, Eq. B3 assumes equal weighting for each trace, though scattering angle dependent weights could be considered to include obliquity and other amplitude effects. The distribution is restricted by the range of values the image spatial frequency may take. For example, time frequency bandlimits and finite apertures restrict the range of image spatial frequencies in a given distribution.

Ideally, the dimensions of the spatial wavelet can be used to determine wavelet width in any direction; though, rarely is the spatial wavelet directly evaluated. Rather, representations which are simpler to evaluate and approximate dimensions of interest are often used. An example is an idealized spatial wavelet described below. Consider a circular aperture centered above an image point in a laterally homogeneous, isotropic half space. Zero offset is continuously sampled inside the circular aperture. Ray paths from the image point to the circumference of the circular aperture define a maximum angle from the vertical, $\theta_{max}$, which is the same for all azimuths. Hence, the image spatial frequencies measured include all vector orientations from vertical to $\theta_{max}$ for all azimuths. Infinite temporal frequency bandwidth is considered first so that the only limit on the image spatial frequency distribution is the acceptance angle, $\theta_{max}$. The spatial wavelet for this case may be described using the rectangle function in cylindrical coordinates. The rectangle function, represented by the symbol $\Pi$, is defined as having value one when the absolute value of its argument is less than one half, and having value zero otherwise. Hence, $$W(\vec{p}) = \Pi\left(\frac{p_r}{2p_z\tan\theta_{max}}\right) = \begin{cases} 1; & \text{if } p_r < p_z\tan\theta_{max}, \\ 0; & \text{otherwise}, \end{cases} \tag{B4}$$

where $\vec{p}_z$ is the image spatial frequency component in the depth direction and $\vec{p}_r$ is the image spatial frequency component in the radial (horizontal) direction. In other words, each image spatial frequency, $\vec{p}=\vec{p}_r+\vec{p}_z$, for which $p_r < p_z \tan\theta_{max} = p \sin\theta_{max}$ has an amplitude of one. The two dimensional Fourier transform in the radial direction, or Hankel transform, of the distribution defined in Eq. B4 gives $$w(r, z=0, p_z) = \frac{p_z\tan\theta_{max}}{r} J_1(2\pi p_z\tan\theta_{max}r), \tag{B5}$$

where the spatial coordinates, r and z, describe a traditional cylindrical coordinate system centered at the image point; z in the depth direction and r in the horizontal directions, and where $J_1$ is the Bessel function of the first kind of order one. Substituting $p \sin\theta_{max} = p_z \tan\theta_{max}$ gives a similar result to that derived in a different approach by A. J. Berkhout, *Seismic Resolution*, Geophysical Press (1984). (Berkhout solves for a subsurface source rather than a subsurface scatterer. Furthermore, Berkhout's notation uses wavenumber in radians per unit length. Substituting $\kappa=2\pi p$ yields the expression ($\kappa \sin\theta_{max}/2\pi r)J_1(\kappa \sin\theta_{max}r)$ given by Berkhout.)

The Fourier transform in $p_z$ cannot be completed for the above distribution. However, if the distribution, $$W(\vec{p}) = \delta(p_z - p_{zo})\Pi\left(\frac{p_r}{2p_z\tan\theta_{max}}\right), \tag{B6}$$

is considered, the spatial wavelet is given by $$w(r, z=0) = \frac{p_{zo}\tan\theta_{max}}{r} J_1(2\pi p_{zo}\tan\theta_{max}r). \tag{B7}$$

This spatial frequency distribution describes a uniform amplitude disk that is aperture limited to $\theta_{max}$ and has a single vertical spatial frequency, $p_z = p_{zo}$. Hence, the horizontal spatial frequency is restricted to the range $0 < p_r < p_{zo} \tan\theta_{max}$. The largest spatial frequency magnitude for this distribution is $p_o = p_{zo}/\cos\theta_{max}$. Perhaps the simplest description of how lateral resolution broadly compares with vertical resolution comes from comparing the lateral component of the spatial wavelet given in Eq. B7 with the wavelet given by a uniform frequency distribution having the same maximum spatial frequency $p_o$. The one dimensional spatial frequency distribution is given by $$W(p) = \Pi\left(\frac{p}{2p_o}\right) = \begin{cases} 1; & \text{if } |p| < p_o, \\ 0; & \text{otherwise}, \end{cases} \tag{B8}$$

and the Fourier transform gives $$w(x) = \frac{\sin(2\pi p_o x)}{\pi x}. \tag{B9}$$

Generally, amplitude scaling has no impact on function widths. So, comparing the radial width of w(r, z=0) to the spatial width of w(x) is accomplished by comparing the functional forms, that is, comparing $J_1(2\pi p_o \sin\theta_{max} r)/r$ to $\sin(2\pi p_o x)/x$. To lower orders, the functional forms $2J_1(\gamma)/\gamma$ and $\sin(\gamma)/\gamma$ can be shown to be similar for smaller values of $\gamma$:

$$\frac{2J_1(y)}{y} = \frac{\sin(y)}{y}\left[1 + \frac{1}{24}y^2 + \frac{11}{2880}y^4 + \frac{367}{967680}y^6 + \ldots\right]. \quad (B10)$$

When functional forms are the same, the difference in function widths derives from the difference in arguments. The ratio of the arguments relates to the inverse ratio of the widths which is the inverse ratio of resolution:

$$\frac{2\pi p_o \sin\theta_{max}}{2\pi p_o} = \sin\theta_{max} \approx \frac{R_v}{R_{lm}}, \quad (B11)$$

where $R_{lm}$ is the lateral resolution of migrated or imaged data. However, the functional forms $2J_1(\gamma)/\gamma$ and $\sin(\gamma)/\gamma$, though similar for smaller values of $\gamma$, are not identical over the whole range of $\gamma$ used to define function widths. Therefore, a precise statement of the ratio of widths of functions given in Eqs. B7 and B9 may differ from the relation in Eq. B11. Furthermore, the aperture limited disk is a convenient case to consider, but Ricker shaped frequency spectra are more realistic. Nonetheless, the approximation is expected to hold valid for practical implementation.

Derivation of the Sampling Requirement

As described in the previous sections, seismic image resolution depends primarily on the width of distribution of image frequencies acquired for a given point of image. The distribution width is largely controlled by the time frequency bandwidth and the migration acceptance angle. That is, it is primarily the time frequency bandwidth and migration acceptance angle that controls information content acquired on a point of image. Sampling controls the extent to which that information may be unambiguously represented and, thus, useable to imaging or other processing algorithms. A familiar example is the Nyquist criterion for a single channel time recording. If a 260 hertz sine wave is sampled at a 2 millisecond sample rate, the resulting data will be the same as that recorded for a 10 hertz sine wave (aliasing). The ambiguity of whether the data represents the 260 hertz sine wave or the 10 hertz sine wave cannot be resolved unless additional information is provided. For example, an antialias filter applied before sampling restricts the input to frequencies less than 250 hertz. In this case, it would be concluded that similar data represents the 10 hertz sine wave. Another possibility, albeit atypical, might be the application of a passband restricting the signal between 250 and 500 hertz. In this case, it would be concluded the data represents a 260 hertz sine wave. In similar fashion, migration algorithms require an unambiguous representation of imaging frequencies. This constitutes a sampling requirement in the domain of imaging to avoid aliasing image frequencies that have been acquired and are intended to contribute to the image. If the requirement is not met, then ambiguous imaging frequencies within the distribution acquired for a given point of image will be mishandled in imaging. Consequently, the mishandled imaging frequencies do not contribute to the image, altering the effective image frequency distribution width and image resolution. Additional spatial sampling requirements may be required for processing operations other than imaging. A familiar example for the PP mode is the offset sampling interval required for tau-p filtering to mitigate multiples. The discussion that follows addresses the sampling requirement for conventional algorithms to image scattered primary energy. However, the survey designer should remain aware that other processing operations may impose additional sampling requirements.

The process of imaging requires that the frequencies to be imaged are not aliased. This constitutes a sampling requirement in the domain of imaging. For dimension x in the domain of imaging, the difference in two way travel time to a point of image on two adjacent traces may not exceed half the period of the time frequency to be included in imaging, $$\Delta T \leq \frac{\tau}{2}, \quad (C1)$$

where $\Delta T$ is the difference in two way travel time to a point of image on two adjacent traces in the domain of imaging and $\tau$ is the period of the time frequency, f, that is to be captured in imaging; $\tau = 1/f$. The change in two way travel time between adjacent traces in x may be approximated by $$\Delta T \approx \Delta x \frac{\partial T}{\partial x}. \quad (C2)$$

Under the assumption of laterally homogeneous overburden velocities the relation $$\frac{\partial T}{\partial x} = \nabla T \cdot \hat{x} \quad (C3)$$

holds where $\hat{x}$ is the unit vector in the direction of $\Delta x$, and $\nabla T$ is the familiar gradient of two way travel time as described in previous sections. Combining these relations, the sampling requirement becomes $$\Delta x \leq \frac{1}{2f \nabla T \cdot \hat{x}}. \quad (C4)$$

Note that $\hat{x}$ is parallel to the plane of acquisition. If the plane of acquisition is horizontal, then $\hat{x}$ is perpendicular to the vertical, and the dot product $\nabla T \cdot \hat{x}$ is also given by $|\nabla T|\sin\theta$, where $\theta$ is the angle between the vertical and $\nabla T$; therefore $$\Delta x \leq \frac{1}{2f|\nabla T|\sin\theta}. \quad (C5)$$

The sampling requirement is determined by the maximum time frequency of interest and the maximum values attained by $\nabla T$ and $\sin\theta$. The maximum time frequency is typically a quantity obtained from trace resolution requirements, and the maximum $\theta$ is typically the migration acceptance angle obtained from lateral resolution requirements. Hence, it is the resolution requirement that drives the sampling requirement; greater sampling generally obtained at greater cost. Evaluating maximum values of $\nabla T$ mostly depends on the scattering angle and can depend on the domain of imaging. The following section discusses imaging in the common offset domain, the most commonly practiced migration approach.

Figure 22:
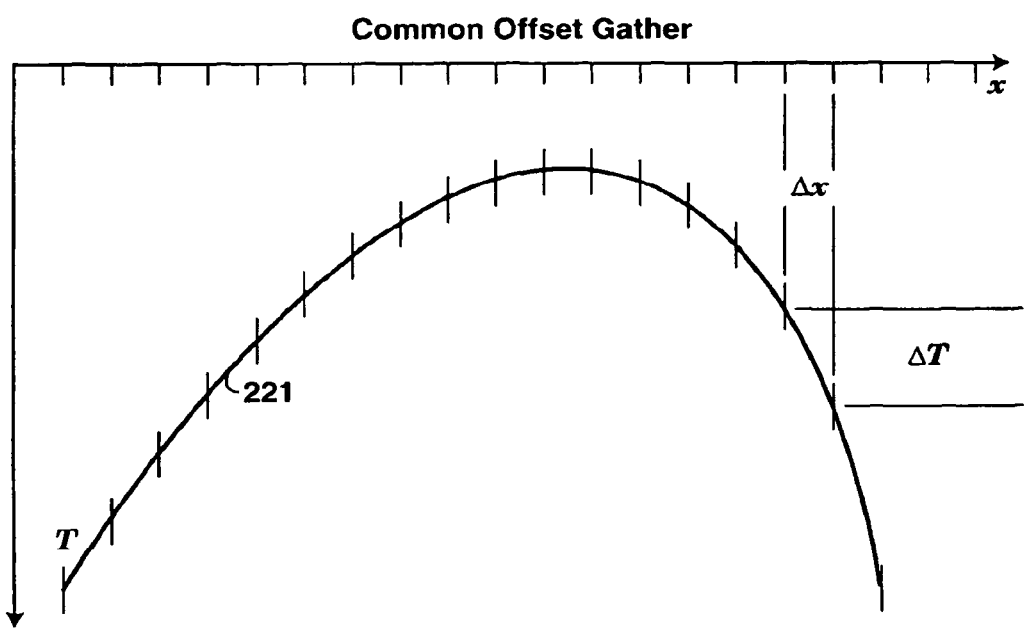
FIG. 22 illustrates discrete sampling of a two-way travel time contour.

Migrating common offset gathers is the most frequently used approach to imaging. An illustration of the sampling criterion described in the previous section applied to a dimension, x, in the common offset domain is illustrated in FIG. 22. The two-way travel time to a point of image is indicated by the contour 221. However, the contour is not continuously sampled along the dimension x (nor along the time dimension, for that matter). There are a finite number of source-receiver pairs, or traces, sampling the contour along x with sampling interval $\Delta x$. The sampling is schematically illustrated by the vertical tick marks.

All traces within an aperture, that is, all traces contributing image frequencies whose angle to the vertical is less than the migration acceptance angle, $\theta \leq \theta_\alpha$, contribute to the image while those traces for which $\theta > \theta_\alpha$ are excluded. Hence, the maximum attained value for $\theta$ is the migration acceptance angle, that is, $$\sin\theta_{max} = \sin\theta_\alpha. \qquad (C6)$$

Recall that $|\nabla T|$ was derived previously and is given by Eq. A20. Generally, the minimum scattering angle of interest determines the maximum value of $|\nabla T|$ to consider. For the PP mode, this is always the backscatter condition, $\psi = 0 \Rightarrow \alpha = \beta = 0$. Though the PS mode returns no energy in the backscatter case, it may still be important to avoid aliasing for any arbitrarily small scattering angle. For a finite scattering angle, the value of $|\nabla T|$ is given by $$|\nabla T| = \frac{\cos\alpha}{V_\alpha} + \frac{\cos\beta}{V_\beta}, \qquad (C7)$$

where $\alpha$ and $\beta$ obey Snell's law. Substituting into Eq. C5 gives the sampling requirement for a finite scattering angle by $$\Delta x \leq \frac{V_\alpha}{2f_{max}(\cos\alpha + \gamma\cos\beta)\sin\theta_\alpha}, \qquad (C8)$$

where $\gamma = V_\alpha/V_\beta$. The maximum attainable value for $\nabla T$ is given for the case of an arbitrarily small scattering angle by $$|\nabla T|_{max} = \lim_{\psi \to 0} |\nabla T| = \frac{1}{V_\alpha} + \frac{1}{V_\beta} = \frac{1+\gamma}{V_\alpha}. \qquad (C9)$$

Hence, a generally sufficient sampling interval to avoid aliasing in the common offset domain is given by $$\Delta x \leq \frac{V_\alpha}{2f_{max}(1+\gamma)\sin\theta_\alpha}. \qquad (C10)$$

In other words, if the interval between traces in a common offset gather does not exceed that given in Eq. C10 then aliasing is avoided. This result is assured regardless of the scattering angles involved in any given common offset gather because the worst case scattering angle, the backscatter case, is satisfied. A meaningful reference for a trace position is the midpoint between source and receiver location. So, the equality for $\Delta x$ in Eq. C10 is the maximum allowed interval between midpoints of adjacent traces in a common offset panel. This holds for both PP and PS modes.

The invention claimed is:

1. A method for converted mode seismic surveying of a subsurface region, comprising:
    (a) obtaining a design for a converted mode seismic survey of the subsurface region, said design having been made to accomplish selected vertical and lateral seismic resolutions at a target depth by:
        (i) determining a minimum source frequency bandwidth required to achieve the selected vertical seismic resolution at target depth, said determination of minimum bandwidth requiring P-wave and S-wave velocities at the target depth and a selected scattering angle $\psi$ between incident and reflected seismic waves or one or more quantities relatable thereto, then selecting a bandwidth $\geq$ the minimum bandwidth;
        (ii) determining a migration acceptance angle and corresponding source and receiver apertures required to achieve the specified lateral seismic resolution at the target depth;
        (iii) determining a maximum bin size required to avoid aliasing a seismic wave returned from the target depth, said determination of maximum bin size requiring P-wave and S-wave velocities at the target depth and the selected scattering angle $\psi$ between incident and reflected seismic waves or one or more quantities relatable thereto, a largest frequency required to achieve the selected bandwidth, and the migration acceptance angle from determined previously, then selecting a bin size $\leq$ said maximum bin size; and
        (iv) determining source and receiver spacings for the survey, using the selected bin size, and determining areas to be covered by source and receiver locations using the source and receiver apertures determined previously; and
    (b) conducting a converted mode seismic survey of the subterranean region according to the obtained survey design.

2. The method of claim 1, wherein the minimum bandwidth is determined in step (i) from the equation $$BW \geq \frac{V_P V_S}{2R_v(V_P^2 + 2V_P V_S \cos\psi + V_S^2)^{1/2}}$$

where $V_P$ and $V_S$ are P-wave and S-wave seismic propagation velocities at the target depth, $R_v$ is the selected vertical seismic resolution at target depth.

3. The method of claim 2, wherein $\psi$ is selected based on considerations including amount of reflected energy vs. scattering angle for the target depth.

4. The method of claim 2, wherein the bandwidth selected relative to the minimum bandwidth determined is based on considerations including source wavelet control and signal-to-noise power ratios achievable for the survey.

5. The method of claim 1, wherein the migration acceptance angle $\theta_\alpha$ is determined from $$R_{lm} \approx \frac{R_v}{\sin\theta_\alpha}$$

where $R_v$ is the selected vertical seismic resolution at target depth and $R_{lm}$ is the selected lateral resolution at the target depth.

6. The method of claim 1, wherein source aperture and receiver aperture are determined using the migration acceptance angle and ray-tracing in a velocity model of the subterranean region.

7. The method of claim 1, wherein the maximum bin size $\Delta x$ required to avoid aliasing a seismic wave returned from the target depth is determined from the equation $$\Delta x \leq \frac{V_p V_s}{2(V_p^2 + 2V_p V_s \cos\psi + V_s^2)^{1/2} f_{max} \sin\theta_a}$$

where $V_P$ and $V_S$ are P-wave and S-wave seismic propagation velocities at the target depth, $f_{max}$ is the largest frequency required to achieve the bandwidth selected in step (i), and $\theta_\alpha$ is the migration acceptance angle determined in step (ii).

8. A method for producing hydrocarbons from a subsurface region, comprising:
(a) obtaining a design for a converted mode seismic survey of the subsurface region, said design having been made to accomplish selected vertical and lateral seismic resolutions at a target depth by:
  (i) determining a minimum source frequency bandwidth required to achieve the selected vertical seismic resolution at target depth, said determination of minimum bandwidth requiring P-wave and S-wave velocities at the target depth and a selected scattering angle $\psi$ between incident and reflected seismic waves or one or more quantities relatable thereto, then selecting a bandwidth$\geq$the minimum bandwidth;
  (ii) determining a migration acceptance angle and corresponding source and receiver apertures required to achieve the specified lateral seismic resolution at the target depth;
  (iii) determining a maximum bin size required to avoid aliasing a seismic wave returned from the target depth, said determination of maximum bin size requiring P-wave and S-wave velocities at the target depth and the selected scattering angle $\psi$ between incident and reflected seismic waves or one or more quantities relatable thereto, a largest frequency required to achieve the selected bandwidth, and the migration acceptance angle from determined previously, then selecting a bin size$\leq$said maximum bin size; and
  (iv) determining source and receiver spacings for the survey, using the selected bin size, and determining areas to be covered by source and receiver locations using the source and receiver apertures determined previously;
(b) conducting a converted mode seismic survey of the subterranean region according to the obtained survey design;
(c) drilling a well at a location and to a depth in the subsurface region indicated by interpretation of results from the converted mode seismic survey; and
(d) producing hydrocarbons from said well.

* * * * *